United States Patent
Godoy-Vargas et al.

(10) Patent No.: US 10,961,832 B2
(45) Date of Patent: Mar. 30, 2021

(54) METHODS OF TREATMENT OF A SUBTERRANEAN FORMATION WITH POLYMERIC STRUCTURES FORMED IN SITU

(71) Applicant: SCHLUMBERGER TECHNOLOGY CORPORATION, Sugar Land, TX (US)

(72) Inventors: Jazmin Godoy-Vargas, Stafford, TX (US); Sergey Makarychev-Mikhailov, St. Petersburg (RU); Brent Busby, Katy, TX (US); Philip Sullivan, Bellaire, TX (US); Patrice Abivin, Houston, TX (US); Marie Cambournac, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 14/338,722

(22) Filed: Jul. 23, 2014

(65) Prior Publication Data

US 2015/0027702 A1    Jan. 29, 2015

Related U.S. Application Data

(60) Provisional application No. 61/857,539, filed on Jul. 23, 2013.

(51) Int. Cl.
*E21B 43/25* (2006.01)
*C09K 8/90* (2006.01)
(Continued)

(52) U.S. Cl.
CPC .............. *E21B 43/25* (2013.01); *C09K 8/035* (2013.01); *C09K 8/502* (2013.01); *C09K 8/512* (2013.01);
(Continued)

(58) Field of Classification Search
CPC ........ E21B 43/26; E21B 43/267; E21B 43/25; C09K 8/50; C09K 2208/08
(Continued)

(56) References Cited

U.S. PATENT DOCUMENTS 3,692,676 A   9/1972  Culter et al.
4,453,829 A   6/1984  Althouse
(Continued)

FOREIGN PATENT DOCUMENTS

EP      0504115 A1    9/1992
WO   2004000967 A1   12/2003
(Continued)

OTHER PUBLICATIONS

Spruijt, et al., "Linear Viscoelasticity of Polyelectrolyte Complex Coacervates", Macromolecules, vol. 46, No. 4, 2013, pp. 1633-1641.
(Continued)

*Primary Examiner* — Silvana C Runyan
(74) *Attorney, Agent, or Firm* — Cameron Sneddon

(57) ABSTRACT

Methods of treating a subterranean formation are disclosed that include placing a treatment fluid into a subterranean formation, the treatment fluid containing a one or more polymers capable of consolidating to form a polymeric structure at a downhole location. Also disclosed are treatment fluids including a polymeric structure for treating a subterranean formation.

28 Claims, 13 Drawing Sheets

(51) Int. Cl.
    *C09K 8/512*     (2006.01)
    *C09K 8/68*     (2006.01)
    *C09K 8/64*     (2006.01)
    *C09K 8/502*     (2006.01)
    *C09K 8/035*     (2006.01)
    *C09K 8/82*     (2006.01)
    *C09K 8/88*     (2006.01)
    *C09K 8/528*     (2006.01)

(52) U.S. Cl.
    CPC .............. *C09K 8/528* (2013.01); *C09K 8/64* (2013.01); *C09K 8/685* (2013.01); *C09K 8/82* (2013.01); *C09K 8/887* (2013.01); *C09K 8/90* (2013.01); *C09K 2208/08* (2013.01)

(58) Field of Classification Search
    USPC ................................ 166/205.1, 250.1, 308.1
    See application file for complete search history.

(56) References Cited

U.S. PATENT DOCUMENTS

| | | | |
|---|---|---|---|
| 4,460,627 A * | 7/1984 | Weaver | C09K 8/50 |
| | | | 427/212 |
| 4,614,435 A | 9/1986 | McIntire | |
| 4,653,585 A * | 3/1987 | Chung | C09K 8/5083 |
| | | | 166/275 |
| 4,671,665 A | 6/1987 | McIntire | |
| 4,808,004 A | 2/1989 | McIntire et al. | |
| 4,838,701 A | 6/1989 | Smith et al. | |
| 4,964,461 A * | 10/1990 | Shu | E21B 49/00 |
| | | | 166/270 |
| 5,046,856 A | 9/1991 | McIntire | |
| 5,330,005 A | 7/1994 | Card et al. | |
| 5,439,055 A | 8/1995 | Card et al. | |
| 5,501,275 A | 3/1996 | Card et al. | |
| 5,667,012 A | 9/1997 | Hoover et al. | |
| 5,726,138 A | 3/1998 | Tsaur et al. | |
| 5,782,300 A | 7/1998 | James et al. | |
| 5,789,349 A * | 8/1998 | Patel | C09K 8/24 |
| | | | 507/118 |
| 6,172,011 B1 | 1/2001 | Card et al. | |
| 6,239,183 B1 | 5/2001 | Farmer et al. | |
| 6,419,019 B1 | 7/2002 | Palmer et al. | |
| 6,482,866 B1 | 11/2002 | Dahayanake et al. | |
| 6,506,710 B1 | 1/2003 | Hoey et al. | |
| 6,703,352 B2 | 3/2004 | Dahayanake et al. | |
| 7,169,427 B2 | 1/2007 | Frith et al. | |
| 7,275,596 B2 | 10/2007 | Willberg et al. | |
| 7,303,018 B2 | 12/2007 | Cawiezel et al. | |
| 7,740,447 B2 | 6/2010 | Pessin et al. | |
| 7,845,516 B2 | 12/2010 | Pessin et al. | |
| 7,905,287 B2 | 3/2011 | Oyler et al. | |
| 2004/0014608 A1 * | 1/2004 | Nguyen | C09K 8/685 |
| | | | 507/200 |
| 2005/0042192 A1 | 2/2005 | Evans et al. | |
| 2006/0073982 A1 * | 4/2006 | Patel | C09K 8/20 |
| | | | 507/129 |
| 2008/0212397 A1 | 9/2008 | Rondeau | |
| 2008/0234147 A1 * | 9/2008 | Li | C09K 8/512 |
| | | | 507/215 |
| 2009/0159287 A1 * | 6/2009 | Tu | C09K 8/5045 |
| | | | 166/300 |
| 2009/0163387 A1 * | 6/2009 | Sullivan | C09K 8/08 |
| | | | 507/202 |
| 2009/0221453 A1 | 9/2009 | Mukhopadhyay et al. | |
| 2009/0270280 A1 * | 10/2009 | Zhang | C09K 8/36 |
| | | | 507/211 |
| 2010/0247908 A1 | 9/2010 | Velev et al. | |
| 2011/0235460 A1 | 9/2011 | Rondeau | |
| 2011/0253366 A1 * | 10/2011 | Berrigan | C09K 8/70 |
| | | | 166/272.1 |
| 2012/0298210 A1 | 11/2012 | Pham et al. | |
| 2013/0048283 A1 | 2/2013 | Makarychev-Mikhailov et al. | |
| 2013/0056213 A1 | 3/2013 | Medvedev et al. | |
| 2014/0090839 A1 | 4/2014 | Al-Nakhli et al. | |
| 2014/0110113 A1 | 4/2014 | Bhaduri | |
| 2014/0209304 A1 | 7/2014 | Reed et al. | |
| 2015/0027702 A1 | 1/2015 | Godoy-Vargas et al. | |
| 2018/0002596 A1 | 1/2018 | Godoy-Vargas et al. | |

FOREIGN PATENT DOCUMENTS

| | | |
|---|---|---|
| WO | 2009131901 A1 | 10/2009 |
| WO | 2014169044 A1 | 10/2014 |

OTHER PUBLICATIONS

International Search Report and Written Opinion issued in International Patent Application No. PCT/US2015/011672 dated Oct. 15, 2018; 12 pages.

* cited by examiner

METHODS OF TREATMENT OF A SUBTERRANEAN FORMATION WITH POLYMERIC STRUCTURES FORMED IN SITU

CROSS REFERENCE TO RELATED APPLICATION

This application claims the benefit of U.S. Provisional Application Ser. No. 61/857,539 filed Jul. 23, 2013 entitled "Methods of Treatment of a Subterranean Formation With Elongated Precipitates Formed In Situ" to Godoy-Vargas et al., the disclosure of the provisional application is incorporated by reference herein in its entirety.

BACKGROUND

Hydrocarbons (oil, natural gas, etc.) may be obtained from a subterranean geologic formation (a "reservoir") by drilling a well that penetrates the hydrocarbon-bearing formation. Well treatment methods often are used to increase hydrocarbon production by using a treatment fluid to interact with a subterranean formation in a manner that ultimately increases oil or gas flow from the formation to the wellbore for removal to the surface.

Many of such treatment fluids use fibers. For example, wellbore treatments that employ treatment fluids containing fibers may include, for example, drilling, reservoir stimulation, and cementing, among others. A variety of fibers may be incorporated into the treatment fluid, with different physical and chemical properties. However, the selection of materials may be limited by the commercial availability and various compatibility issues, such as with surface storage and handling. In addition, concerns remain regarding the addition of fibers into fluids (at the surface) and potential clogging of various wellbore equipment.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In some embodiments, the present disclosure relates to methods for treating a subterranean formation. Such methods may include, in any order: placing a treatment fluid including at least one or more polymers into a subterranean formation via a wellbore; adjusting at least one parameter of the treatment fluid; exposing the treatment fluid to a shear event; and consolidating the one or more polymers into at least one polymeric structure.

In some embodiments, the present disclosure relates to treatment fluids including a solvent, and a polymeric structure containing at least one polymer, where the polymeric structure is formed by consolidating the one or more polymers during a shear event.

BRIEF DESCRIPTION OF THE DRAWINGS

The manner in which the objectives of the present disclosure and other desirable characteristics may be obtained is explained in the following description and attached drawings in which.

DETAILED DESCRIPTION

Figure 1:
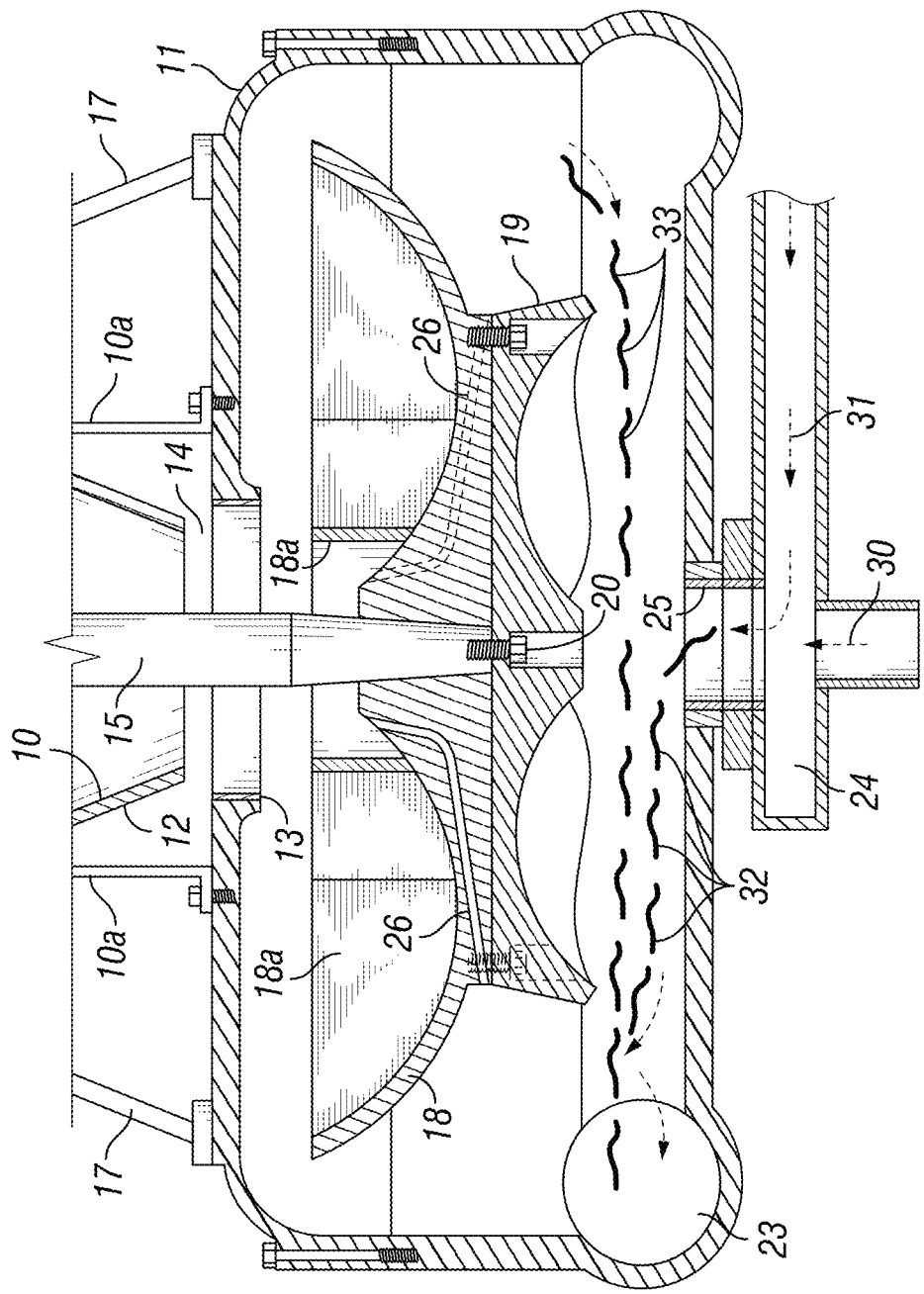
FIG. 1 is a schematic illustration of a device that may be used to generate a shear event.

In the following description, numerous details are set forth to provide an understanding of the present disclosure. However, it may be understood by those skilled in the art that the methods of the present disclosure may be practiced without these details and that numerous variations or modifications from the described embodiments may be possible.

At the outset, it should be noted that in the development of any such actual embodiment, numerous implementation-specific decisions may be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the composition used/disclosed herein can also comprise some components other than those cited. In the summary and this detailed description, each numerical value should be read once as modified by the term "about" (unless already expressly so modified), and then read again as not so modified unless otherwise indicated in context. The term about should be understood as any amount or range within 10% of the recited amount or range (for example, a range from about 1 to about 10 encompasses a range from 0.9 to 11). Also, in the summary and this detailed description, it should be understood that a range listed or described as being useful, suitable, or the like, is intended to include support for any conceivable sub-range within the range at least because every point within the range, including the end points, is to be considered as having been stated. For example, "a range of from 1 to 10" is to be read as indicating each possible number along the continuum between about 1 and about 10. Furthermore, one or more of the data points in the present examples may be combined together, or may be combined with one of the data points in the specification to create a range, and thus include each possible value or number within this range. Thus, (1) even if numerous specific data points within the range are explicitly identified, (2) even if reference is made to a few specific data points within the range, or (3) even when no data points within the range are explicitly identified, it is to be understood (i) that the inventors appreciate and understand that any conceivable data point within the range is to be considered to have been specified, and (ii) that the inventors possessed knowledge of the entire range, each conceivable sub-range within the range, and each conceivable point within the range. Furthermore, the subject matter of this application illustratively disclosed herein suitably may be practiced in the absence of any element(s) that are not specifically disclosed herein.

Fibers are well known to be used for various purposes in oilfield treatment operations. For example, methods such as fiber assisted transport have been used to improve particle transport in fracturing and wellbore cleanout operations while reducing the amount of other fluid viscosifiers employed. The methods of the present disclosure employ polymeric structures (comprising one or more polymers) formed in situ.

In some embodiments, the consolidation of the one or more polymers occurs while the treatment fluid is exposed to a shear event of a predetermined shear rate in order to form a polymeric structure with a desired shape and size, such as a polymeric structure in which the polymeric structure is formed with one dimension being longer than the other dimensions as a result of the application of a shear event to the treatment fluid.

The term "shear event" refers to the exertion of a force (or energy), such as in the form of shear flow, applied to a pumpable and/or flowable treatment fluid (or treatment fluid system including a mixture of two or more treatment fluids) resulting in shearing deformation. In some embodiments, the pumpable and/or flowable treatment fluid may have any suitable viscosity, such as a viscosity of from about 1 cP to about 10,000 cP (such as from about 10 cP to about 1000 cP, or from about 10 cP to about 100 cP) at the treating temperature, which may range from a surface temperature to a bottom-hole static (reservoir) temperature, such as from about −40° C. to about 150° C., or from about 10° C. to about 120° C., or from about 25° C. to about 100° C., and a shear rate (for the definition of shear rate reference is made to, for example, Introduction to Rheology, Barnes, H.; Hutton, J. F; Walters, K. Elsevier, 1989, the disclosure of which is herein incorporated by reference in its entirety), during the application of a shear event, in a range of from about $1\ s^{-1}$ to about $100000\ s^{-1}$, such as a shear rate in a range of from about $100\ s^{-1}$ to about $10000\ s^{-1}$, or a shear rate in a range of from about $500\ s^{-1}$ to about $5000\ s^{-1}$ as measured by common methods, such as those described in textbooks on rheology, including, for example, Rheology: Principles, Measurements and Applications, Macosko, C. W., VCH Publishers, Inc. 1994, the disclosure of which is herein incorporated by reference in its entirety.

Forming polymeric structures in-situ during a downhole treatment operation may allow for the production of filaments or fibers (fiber-like precipitates) with unique morphologies and/or properties that are not present in filaments or fibers produced by conventional synthesis methods. Making the polymeric structures (may also referred to herein as a "fiber-like structure" or "elongated" provided that the aspect ratio is at least 2:1, unless otherwise specified) in situ may also reduce the risk of clogging of wellbore and subterranean structures, and equipment. In addition, the in-situ formation processes of the present disclosure may allow for the use of materials that may be incompatible with surface addition equipment, such as for example, materials that either stick to the equipment or materials that would not survive the mixing conditions.

As used herein, the term "treatment fluid," refers to any pumpable and/or flowable fluid used in a subterranean operation in conjunction with a desired function and/or for a desired purpose. Such fluids may be modified to contain a composition containing a one or more polymers that may be exposed to a shear event to form the polymeric structure, which may ultimately become a fiber-like structure (formed at any time during the treatment operation), such as by adjusting at least one parameter of the treatment fluid while exposing the treatment fluid to a shear event to form the polymeric structure. For example, the treatment fluid may be exposed to a shear event in which an effective shear rate is being applied to the treatment fluid while the at least one parameter is adjusted in order to generate the polymeric structure. In some embodiments, the treatment fluids of the present disclosure do not contain an emulsion and/or are of a single phase, for example, either aqueous or organic.

In embodiments, the methods of the present disclosure may include the following actions, in any order: placing a treatment fluid including at least one or more polymers into a subterranean formation via a wellbore; adjusting at least one parameter of the treatment fluid; and exposing the treatment fluid to a shear event to consolidate the one or more polymers into at least one polymeric structure. The terms "placing" or "placed" refer to the addition of a treatment fluid to a subterranean formation by any suitable means and, unless stated otherwise, do not imply any order by which the actions occur. Furthermore, the terms "adjusting", "adjusted", "exposing" "exposed" and "consolidating" and "consolidated", unless stated otherwise also do not imply any order. The term "introduced" refers when used in connection with the addition of a treatment fluid to a subterranean formation may or may not imply an order of accomplishing the recited actions, if not stated otherwise.

The term "one or more polymers" refers to one or more polymeric entities or species that may be used to form polymeric structures (fiber-like precipitates) in situ during a treatment operation. For example, polymeric structures of the one or more polymers, and/or a reaction product thereof, may form upon adjusting one or more of the parameters of the treatment fluid such that the one or more polymers consolidates in the treatment fluid while the treatment fluid is exposed to a predetermined shear rate in a treatment operation of a subterranean formation, such as a downhole treatment operation of a subterranean formation. In embodiments, an identified dissolvable polymer may be used as the one or more polymers in the treatment fluids and methods of present disclosure. Such dissolvable polymers may have any desired molecular weight. For example, the dissolvable polymers suitable for use as the one or more polymers in the treatment fluids and methods of present disclosure may have a weight average molecular weight greater than about 5000 Daltons up to about 20,000,000 Daltons or more, or from about 10,000 Daltons to about 2,000,000. Specific examples of the one or more polymers are described below.

As used herein, the terms "consolidation event" or "consolidation triggering event" refer to any action that is sufficient to initiate the consolidation (in the treatment fluid) of the one or more polymers and/or a reaction product thereof. For example, the term "consolidating event" as used herein, may include subjecting the one or more polymers to a mechanical means, physical means, chemical means, thermal means and other means to initiate, catalyze, or otherwise induce or cause the one or more polymers to transform from a dissolved form to an insoluble form. In some embodiments, consolidating event may be any condition that results in the consolidation of the one or more polymers comprising one or more polymers and/or a reaction product thereof, such as, for example, a pH change, a temperature change, a change in the ionic concentration (including formation of polyelectrolyte complexes), a change in hydrophobicity, a change in the solvent composition, and/or a change in the molecular weight (such as a cross-linking reactions).

As used herein, the terms "consolidate"; "consolidation" or "consolidating" refer to the formation of one or more polymeric materials into a compact mass. Example of various types of consolidation include precipitation, amorphous gel formation, flocculation, coagulation, syneresis, aggregation, crystallization, coalescence, agglomeration and or combinations thereof. In some embodiments, the treatment fluid may act as a vehicle that contains, and optionally chemically isolates, one or more polymers while it is being transported into the subterranean formation until the conditions are sufficient for the consolidation to occur.

The term "treatment," or "treating," does not imply any particular action by the fluid. For example, a treatment fluid placed or introduced into a subterranean formation subsequent to a leading-edge fluid may be a hydraulic fracturing fluid, an acidizing fluid (acid fracturing, acid diverting fluid), a stimulation fluid, a sand control fluid, a completion fluid, a wellbore consolidation fluid, a remediation treatment fluid, a cementing fluid, a driller fluid, a frac-packing fluid, or gravel packing fluid. The methods of the present disclosure include forming a polymeric structure by exposing the treatment fluid comprising one or more polymers to a shear event effective to form a polymeric structure (or fiber-like precipitate) of a desired dimension. The treatment fluids comprising a composition including a one or more polymers that may be adjusted to form a polymeric structure upon being induced to consolidate and exposed to a predetermined amount of shear, may be used in full-scale operations, pills, or any combination thereof. As used herein, a "pill" is a type of relatively small volume of specially prepared treatment fluid placed or circulated in the wellbore.

As used herein, the term "treating temperature," refers to the temperature of the treatment fluid that is observed while the treatment fluid is performing its desired function and/or desired purpose.

The term "fracturing" refers to the process and methods of breaking down a geological formation and creating a fracture, such as the rock formation around a wellbore, by pumping fluid at very high pressures (pressure above the determined closure pressure of the formation), in order to increase production rates from or injection rates into a hydrocarbon reservoir. The fracturing methods of the present disclosure may include a composition one or more polymers that may be consolidated to form a polymeric structure upon exposure to a predetermined shear rate in one or more of the treatment fluids, but otherwise use conventional techniques known in the art.

The treatment fluids of the present disclosure (and polymeric structures formed during the methods of the present disclosure) may be introduced during methods that may be applied at any time in the life cycle of a reservoir, field or oilfield. For example, the methods and treatment fluids of the present disclosure may be employed in any desired downhole application (such as, for example, stimulation) at any time in the life cycle of a reservoir, field or oilfield.

In embodiments, the treatment fluids of the present disclosure, which comprise a composition containing one or more polymers that may be consolidated to form a polymeric structure that is capable of elongation upon exposure to a shear event in which a predetermined shear rate is applied to the treatment fluid, may be placed or introduced into a wellbore. A "wellbore" may be any type of well, including, a producing well, a non-producing well, an injection well, a fluid disposal well, an experimental well, an exploratory deep well, and the like. Wellbores may be vertical, horizontal, deviated some angle between vertical and horizontal, and combinations thereof, for example a vertical well with a non-vertical component.

The term "field" includes land-based (surface and subsurface) and sub-seabed applications. The term "oilfield," as used herein, includes hydrocarbon oil and gas reservoirs, and formations or portions of formations where hydrocarbon oil and gas are expected but may additionally contain other materials such as water, brine, or some other composition.

As used herein, the term "polymeric structure" refers to any structure or material that consolidated from exposing the one or more polymers to a shear event or a consolidation event. The polymeric structures generated by the methods of the present disclosure are generally straight, however, curved, crimped, spiral-shaped, branched, irregular-shaped, and other three-dimensional geometries may also be formed by the methods of the present disclosure. Examples of other three-dimensional geometries include spheres, ovals, ellipsoids and ribbon-like geometries. The polymeric structures formed in situ by the methods of the present disclosure may have an aspect ratio of at least about 1:1. These types of polymeric structures are generally considered to have a spherical shape. As used herein, the aspect ratio of the polymeric structure is defined as the ratio of its average length (that is, its longest dimension) to its average diameter (that is, its shortest dimension). The polymeric structures formed in situ by the methods of the present disclosure are considered to be elongated when they possess an aspect ratio greater than about 2:1. In embodiments, the polymeric structures formed in situ by the methods of the present disclosure may have an aspect ratio greater than about 3:1, or greater than about 4:1, or greater than about 6:1, or greater than about 10:1, or greater than about 50:1. In some embodiments, the polymeric structures formed in situ by the methods of the present disclosure may have an aspect ratio in the range of from about 1:1 to about 100000:1, or an aspect ratio in the range of from about 2:1 to about 50000:1, or an aspect ratio in the range of from about 2:1 to about 1000:1, or an aspect ratio in the range of from about 3:1 to about 100:1, or an aspect ratio in the range of from about 4:1 to about 50:1.

In embodiments, the polymeric structures formed in-situ may have a diameter of about 5 mm or less. In some embodiments, the polymeric structures in-situ may have a diameter in the range of from about 0.01 mm to about 5 mm, such as a diameter in the range of from about 0.1 mm to about 2 mm. In some embodiments, the polymeric structures (fiber-like precipitates) formed in-situ may have a diameter in the range of from about 1 µm to about 250 µm, such as a diameter in the range of from about 10 µm to about 100 µm.

One method to control the length and/or morphology of the consolidated polymeric structure is to impart additional tension on the material at a given point in the shear field. This may be accomplishing by accelerating the surrounding fluid through a constriction placed at a specific distance downstream of the initial point of consolidation. The acceleration of the surrounding fluid imparts additional shear and tension, parallel to the flow field, greater than the tensile/yield strength of the consolidating material consequently breaking at the injection point. The length of the material can therefore be controlled by the position of the injection point and the subsequent downstream restriction. The length of the material produced in this manner is approximately the length between these two points. In embodiments, the polymeric structures formed in-situ may have a length in the range of from about 500 µm to about 50 cm, such as a length in the range of from about 1 mm to about 50 cm. In some embodiments, the polymeric structures formed in-situ may have a length in the range of from about 500 µm to about 1000 µm.

As mentioned above, the in situ formation of the polymeric structure, and/or a reaction product thereof, may prevent the clogging of structures during the treatment operation (for example, if the polymeric structures are formed downstream of screens or tools) and/or materials from sticking on the surface mixing equipment or other structures near the surface. For example, in some embodiments, the at least one parameter (which may be adjusted to initiate the consolidation) is adjusted within the wellbore to consolidate the one or more polymers after the treatment fluid has been placed or introduced into the wellbore. In such embodiments, exposing the treatment fluid to a shear event to form a polymeric structure may occur at one or more underground locations, such as underground locations selected from the group consisting of the wellbore and the subterranean formation. Additionally, in some embodiments, one or more polymers may be added to the treatment fluid at an underground location within the wellbore. In such embodiments, the polymeric structure may be formed downhole, such as before reaching the target treatment zone or target subterranean formation, but after the treatment fluid is placed or introduced into the wellbore. Forming the polymeric structures downhole may prevent the polymeric structures from settling before the fluid reaches the target treatment zone or target subterranean formation.

The methods of the present disclosure generate polymeric structures downhole by exposing a treatment fluid that is undergoing a consolidation event of the one or more polymers comprised therein to a shearing event in which the treatment fluid is exposed to a predetermined shearing rate. In embodiments, the methods of the present disclosure may comprise applying a shearing force of a predetermined shear rate to a treatment fluid present in a subterranean formation while the one or more polymers is consolidated out of the treatment fluid in order to generate a polymeric structure in situ. Such polymeric structures may be used in any desired treatment operation, such as, for example, drilling, reservoir stimulation, and cementing, among others. In some embodiments, the one or more polymers is not extruded at any time during the treatment operation. In other words, in embodiments, the one or more polymers is consolidated out of the treatment fluid (in the bulk of the treatment fluid) in order to generate the polymeric structures in situ.

As discussed in more detail below, in embodiments, the methods of the present disclosure may manipulate (1) the solubility of the one or more polymers in a treatment fluid, (2) the chemical composition of the treatment fluid, and/or (3) the shear event experienced by the treatment fluid containing the one or more polymers, to generate a polymeric structure comprising the one or more polymers and/or a reaction product thereof. In some embodiments, the polymeric structure may be generated by simultaneously consolidating the one or more polymers (the consolidation of which is controlled by adjusting the chemical and/or physical properties of the treatment fluid) while exposing the treatment fluid to a shear event.

Generating a Shear Event

Any suitable method may be used to expose the treatment fluid to a shear event in which an effective shear rate is applied to the treatment fluid (for example, concurrently with the consolidation event and optionally continuing until the consolidation has ceased) in order to produce the polymeric structures.

One of the primary mechanisms to control the diameter and morphology during the consolidation process is to manipulate the shear field of the system. A certain amount of shear may generate a controlled shape, and the diameter of the polymeric structures formed decreases with shear rate, likely due to the higher extensional force applied on the fluid containing the one or more polymers. This trend is observed in various experimental setups and polymer systems (see e.g., Examples 20-22).

In some embodiments, the treatment fluid comprising the one or more polymers may be subjected to a shear event in any mixing vessel, apparatus or device, such as, for example, mixing vessels, mixing apparatus, pipes, tubing, conduits, dynamic liquid dispersing or pumping devices, such as centrifugal pumps. The treatment fluids can also be exposed to a shearing event while being pumped in a loop through various pipes, tubing, and/or conduits. In such embodiments, the treatment fluid may pass through the pumping apparatus, such as a centrifugal pump, several times until the desired polymeric structures are obtained. Dynamic dispersing and pumping devices may be, for example, hydrodynamic flow machines, for example single- or multiple-stage rotary centrifugal pumps such as radial centrifugal pumps. A few of the above-mentioned items are described in more detail below.

In some embodiments, the shear event may occur in a blender apparatus, such as the blender apparatus illustrated (in part) in FIG. 1, and described in detail in U.S. Pat. No. 4,614,435, the disclosure of which is incorporated herein by reference in its entirety. Briefly, at the top of the blender apparatus is a hopper 10, which provides a container for solid particles, such as proppants (not shown). In FIG. 1, the hopper 10 is mounted on the top side of a housing 11 and held in place by supports 10a. As illustrated in FIG. 1, the bottom end of the hopper, which is the outlet end 12, terminates just above inlet eye 13 in housing 11. Sand or other solids from the hopper are dropped into the housing through the inlet eye. Positioning the outlet end 12 just above the inlet eye 13 provides an exterior air exhaust space 14 between the hopper and the inlet eye.

A drive shaft 15 is positioned inside the hopper 10, such that the bottom of the shaft extends through the inlet eye 13 and into housing 11. The shaft is driven by a motor (not shown) the top end of the shaft. The motor may be supported by rods 17, which may be fastened into a housing. The mixer elements of the blender apparatus for exposing the treatment fluid to a shear event may include a slinger member 18 and an impeller member 19. The impeller is secured to the bottom end of drive shaft 15 by a bolt fastener 20.

Slinger 18 has a central opening therein (not shown) that allows it to fit over the bottom end of the drive shaft 15 above the bolt fastener 20. The slinger has a toroidal configuration, including a concave surface that faces toward the top of the housing 11.

As illustrated in FIG. 1, the topside concave surface of slinger 18 is interrupted by several upstanding blade members 18a. Housing 11 encloses the slinger 18 and impeller 19, and the housing includes an outlet port 23, for discharging material from the housing. In the structure illustrated in FIG. 1 an interior air exhaust means is provided by one or more air exhaust channels 26. One end of an inlet conduit 24 is connected into the housing 11 and the opposite end of the conduit is connected into a source for a fluid composition, such as first treatment fluid, which may be consolidated to form a polymeric structure 32. During the mixing operation the first treatment fluid 30 and optionally a second treatment fluid 31 may be drawn into the housing 11 through the inlet conduit 24 and a suction-eye inlet 25 at the bottom of the housing 11. In such embodiments, the flow rate of the treatment fluid, for example while the treatment fluid is being exposed to the shear event that generates the polymeric structures, is in a range of from about 10 Liters/minute (L/min) to about 12000 L/min, such as from about 80 L/min to about 8000 L/min, or from about 600 L/min to about 4000 L/min.

In some embodiments, a first treatment fluid may contain the one or more polymers, and a second treatment fluid being introduced into the vessel comprising the first treatment fluid may comprise a triggering additive (to trigger the consolidation of the one or more polymers). Such fluids may be mixed in such a manner that a shear event begins and/or is occurring upon mixing of the two treatment fluids (while the consolidation of the one or more polymers is occurring). While the treatment fluid is in the blender apparatus, consolidation of the one or more polymers may be brought about by, for example, a mechanical means, physical means, chemical means, thermal means and other means to initiate, catalyze, or otherwise induce or cause the one or more polymers and/or a reaction product thereof to transform from a dissolved form to an insoluble form.

In such embodiments, the methods of the present disclosure may be used to tailor the dimensions (length and/or diameter) of the polymeric structure by selecting the one or more polymers and setting the shear rate applied to a treatment fluid that is being triggered to form a polymeric structure comprising one or more polymers. In such embodiments (as well as the embodiments discussed below), such a shear rate (assessed under the conditions discussed above) may be in a range of from about $1\ s^{-1}$ to about $100000\ s^{-1}$, such as a shear rate in a range of from about $100\ s^{-1}$ to about $10000\ s^{-1}$, or a shear rate in a range of from about $500\ s^{-1}$ to about $5000\ s^{-1}$, and one or more of the above shear rates may be used to form a polymeric structure having a diameter of from about 0.01 mm to about 5 mm, such as a diameter in the range of from about 0.1 mm to about 2 mm, or from about 1 μm to about 250 μm, or from about 10 μm to about 100 μm.

In some embodiments, a solid material, such as a proppant may be mixed with a treatment fluid suitable for injecting into a fracture to stimulate recovery of oil or gas. At the start of the mixing operation, the motor may be employed to rotate the drive shaft 15, slinger 18, and impeller 19. With the slinger and impeller in motion, a desired amount of proppant is dropped into hopper 10, so that it flows in a continuous stream through the inlet eye 13 and drops onto the rotating slinger 19. As the proppant drops onto the slinger, it is propelled outwardly into the housing 11. With the vortex impeller rotating at the same speed as the slinger, the vortex action of the impeller creates a suction force inside the housing, and this force pulls the treatment into the housing through the suction-eye inlet 25 and thereby exposing the treatment to a shear event that may form polymeric structures (for example, such polymeric structures may be in addition to those formed above), if a consolidation event is initiated (as discussed above).

Additionally, as the treatment fluid is pulled into the housing 11, it may be pressurized by the impeller and it interfaces with the proppant being flung outwardly from slinger 18. The result is a further location where the treatment fluid may be exposed to a shear event effective to generate additional polymeric structures 33 (upon triggering the treatment fluid to undergo a consolidation event). The treatment fluid may then be continuously discharged under pressure through the outlet port 23, which may expose the treatment fluid to another shear event effective to generate polymeric structures (not shown) (upon triggering the treatment fluid to undergo a consolidation event). From port 23 the treatment fluid is carried into a pumper unit, for injection into a wellhead and down the wellbore. The pumper unit, the well head, and the borehole are not illustrated in the drawing. In such embodiments, the flow rate of the treatment fluid, for example while the treatment fluid is being exposed to the shear event that generates the polymeric structures, is in a range of from about 10 Liters/minute (L/min) to about 12000 L/min, such as from about 80 L/min to about 8000 L/min, or from about 600 L/min to about 4000 L/min.

Figure 2:
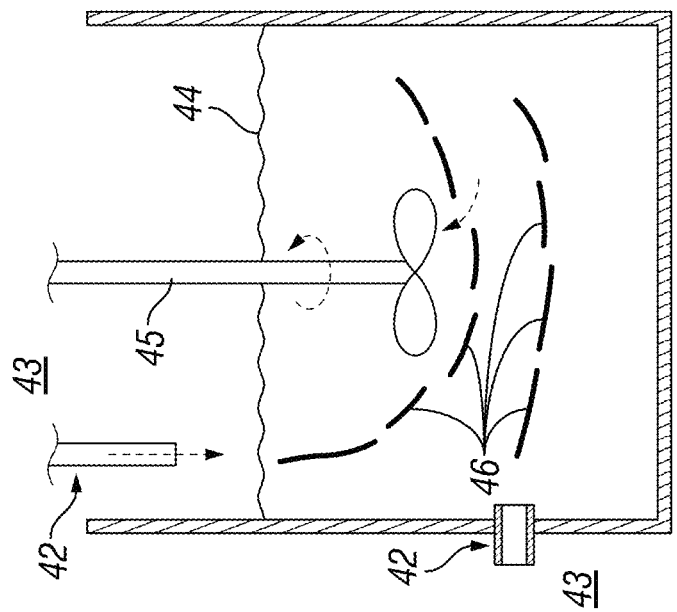
FIG. 2 is a schematic illustration of a device with an impeller that may be used generate a shear event.

In some embodiments, the shear event may occur in an apparatus, such as the apparatus illustrated in FIG. 2, comprising a vessel 40 in which there is mounted a stirring mechanism 41 adapted to be driven by a motor (not shown). The vessel and/or stirring mechanism may include a means, such as one or more inlets 42, for placing a first treatment fluid 43 and a second treatment fluid 44 and/or continuously recirculating treatment fluid through the vessel. The stirring mechanism shaft 45 of the apparatus of FIG. 2 may be a hollow elongated shaft (driven in rotation by the motor) and extending vertically into the vessel.

While the treatment fluid is in the apparatus the one or more polymers may be exposed to a mechanical means, physical means, chemical means, thermal means and other means to initiate, catalyze, or otherwise induce or cause the one or more polymers and/or a reaction product thereof to transform from a dissolved form to an insoluble form. For example, in the apparatus of FIG. 2, a first treatment fluid may contain the one or more polymers, and a second treatment fluid being introduced into the vessel comprising the first treatment fluid may comprise a triggering additive (to trigger the consolidation of the one or more polymers). Such fluids may be mixed in such a manner that a shear event occurs upon mixing of the two treatment fluids (while the consolidation of the one or more polymers is occurring). In such embodiments, the flow rate of the treatment fluid, for example, while the treatment fluid is being exposed to the shear event that generates the polymeric structures, is in a range of from about 10 Liters/minute (L/min) to about 12000 L/min, such as from about 80 L/min to about 8000 L/min, or from about 600 L/min to about 4000 L/min.

In such embodiments, the methods of the present disclosure may be used to tailor the dimensions (length and/or diameter) of the polymeric structure by selecting the appropriate one or more polymers and setting the shear rate applied to a treatment fluid that is being triggered to form a polymeric structure comprising one or more polymers. In such embodiments (as well as the embodiments discussed below), such a shear rate may be in a range of from about 50 $s^{-1}$ to about 100000 $s^{-1}$ (for example, shear rates toward the upper end of this range may be generated when the second treatment fluid is introduced into the first treatment fluid via a nozzle, such as a bit nozzle), such as a shear rate in a range of from about 100 $s^{-1}$ to about 10000 $s^{-1}$, or a shear rate in a range of from about 500 $s^{-1}$ to about 5000 $s^{-1}$.

Circulation of the first treatment fluid may be driven by an impeller 45 (or a plurality of impeller vanes) mounted on the shaft about its lower or perforated end, the vanes extending outwardly from the shaft. The impeller 45 may have any geometry that induces rotational mixing. Rotation of the vane(s) with the shaft creates, adjacent the lower end of the shaft, a region where a shear event effective to generate polymeric structures 46 may also occur (upon triggering the treatment fluid to undergo a consolidation event).

Figure 3:
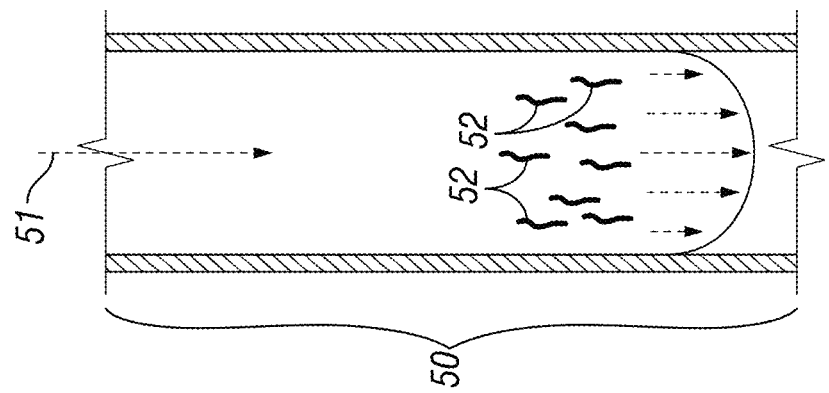
FIG. 3 is a schematic illustration of a conduit that may be used generate a shear event.

In some embodiments, exposure to low and/or high shear may also be brought about within the tubulars during pumping from the surface to reservoir depth. For example, as illustrated in FIG. 3, the shear event effective to generate polymeric structures 52 (upon triggering the treatment fluid to undergo a consolidation event, such as, for example, by a change in downhole conditions) may occur in a pipe 50. For example, in some embodiments, the treatment fluid comprising one or more polymers may be exposed to the consolidation event that is brought about by a predetermined downhole condition (such as, for example, temperature or pressure) or predetermined downhole environment (such as for example, the surrounding chemicals, the phase thereof, pH, ionic strength, temperature, pressure, etc.). In some embodiments, the treatment fluid may contain the one or more polymers and a triggering additive.

Any suitable pipe shape, such as a cylindrical pipe 50, as illustrated in FIG. 3, in which an effective shear rate may be generated may be used. In embodiments, the shear rate in the pipe may depend on the geometry of the pipe and the flow rate of the treatment fluid 51. In some embodiments, the flow rate of the treatment fluid, for example while the treatment fluid is being exposed to the shear event that contributes to the generation of the polymeric structures, is in a range of from about 10 Liters/minute (L/min) to about 20000 L/min, such as from about 80 L/min to about 16000 L/min, or from about 800 L/min to about 12000 L/min.

Figure 4:
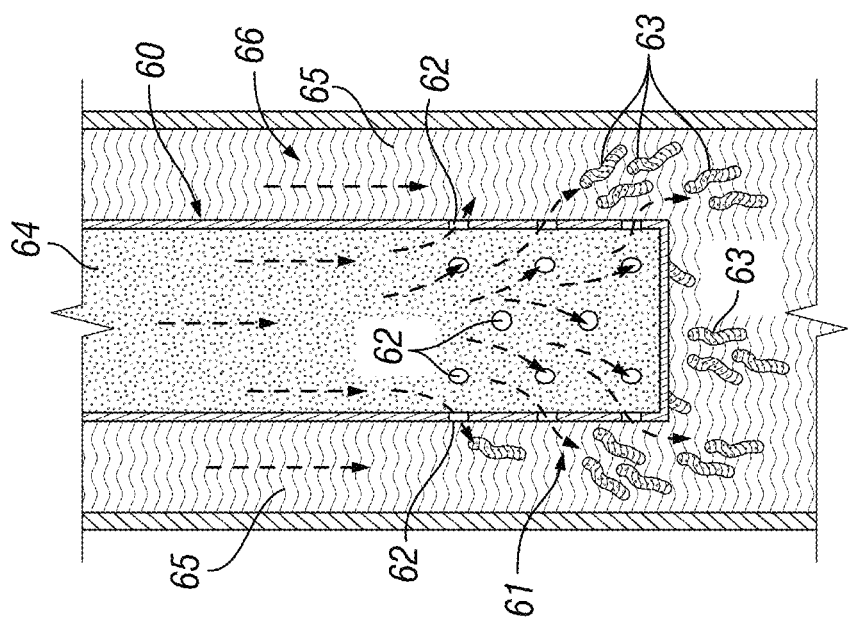
FIG. 4 is a schematic illustration of a structure including a conduit with perforations that may be used generate a shear event.

In some embodiments, exposing the treatment fluid to a shear event may involve pumping the one or more fluids downhole via tubing or a pipe having a perforated portion, as illustrated in FIG. 4. For example, as shown in FIG. 4, an inner pipe 60 with a perforated end 61 comprising a plurality of openings 62 may be used to generate polymeric structures 63 (upon triggering the treatment fluid undergo a consolidation event, as discussed above). For example, a first treatment fluid 64 being introduced into the inner pipe 60 may contain the one or more polymers, and a second treatment fluid 65 being introduced into the wellbore annulus 66 may comprise a triggering additive (to trigger the consolidation of the one or more polymers upon the coannular mixing of the first and second treatment fluids). In such embodiments, the above-mentioned first treatment fluid may be introduced into the wellbore annulus 66 and the above-mentioned second treatment fluid may be introduced into the inner pipe 60. In such embodiments, the flow rate of the first and second treatment fluid, for example while the first and second treatment fluid is being exposed to the shear event that generates the polymeric structures, is in a range of from about 10 Liters/minute (L/min) to about 20000 L/min, such as from about 80 L/min to about 16000 L/min, or from about 800 L/min to about 12000 L/min.

Figure 5:
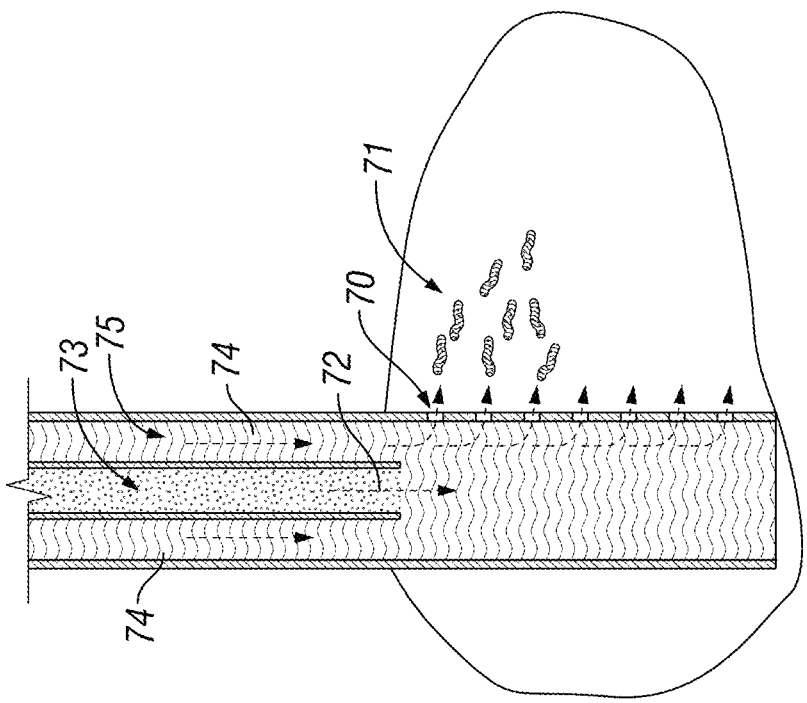
FIG. 5 is a schematic illustration of a structure with inner and outer conduits deployed in a wellbore that may be used generate a shear event.

In some embodiments, as illustrated in FIG. 5, the shear event may generated due to the presence of a perforations 70 in the wellbore adjacent to the formation 71, such as perforations in a wellbore casing or a perforated pipe. In embodiments, the width may be made narrow to keep out particulate contaminants while maintaining acceptable flow rates to ensure an adequate shear rate may be obtained to generate the polymeric structure.

In embodiments, a first treatment fluid 72 being introduced into the inner pipe 73 may contain the one or more polymers, and a second treatment fluid 74 being introduced into the wellbore annulus 75 may comprise a triggering additive (to trigger the consolidation of the one or more polymers upon the coannular mixing of the first and second treatment fluids). If desired, the first treatment fluid and the second treatment fluid may be the same. In such embodiments, the treatment fluid comprising the one or more polymers may be exposed to the consolidation event that is brought about by a predetermined downhole condition (such as, for example, temperature or pressure) or predetermined downhole environment (such as for example, the surrounding chemicals, the phase thereof, pH, ionic strength, temperature, pressure, etc.). In such embodiments, the flow rate of the treatment fluid through the perforations, and while the treatment fluid is being exposed to the shear event that generates the polymeric structures, is in a range of from about 10 Liters/minute (L/min) to about 20000 L/min, such as from about 80 L/min to about 16000 L/min, or from about 800 L/min to about 12000 L/min.

In embodiments, conduits, coiled tubing with a perforated end, or a pipe with one or more bit nozzles may also be used in a similar manner to generate polymeric structures (upon triggering the treatment fluid undergo a consolidation event, as discussed above). In embodiments, a pumping apparatus (positioned either at the surface of the wellbore or down hole, or both) may be used in connection with conduits having a perforated portion, such as, for example, a perforated end; tubing or a pipe having a perforated portion, such as, for example, a pipe with a perforated end; coiled tubing having a perforated portion, such as, for example, a perforated end; or a pipe with one or more bit nozzles.

For example, in some embodiments, the pumping apparatus may be connected to a first conduit and a second conduit. For example, the pumping apparatus may be connected to concentric coil tubing. Concentric coil tubing may be transported on a truck mounted coil or reel. Concentric coil tubing may have an inner tube and an outer tube. In embodiments, the inner tube serves as the first conduit, which may contain the treatment fluid of the present disclosure, and/or a component that triggers the consolidation of the one or more polymers. An annulus formed between the inner tube and the outer tube can serve as the second conduit, which may contain the treatment fluid of the present disclosure, and/or a component that triggers the consolidation of the one or more polymers. In some embodiments, a pump truck may also be used to supply the desired pumping force to generate an effective shear event.

In some embodiments, the methods of the present disclosure may comprise activating an additional pumping apparatus to increase the pressure in one or more of the conduits until a shear rate effective to form polymeric structures during a consolidation event. Such a shear rate may be created by a condition in which pressure in the inner tube is greater than pressure within outer tube and wellbore. This induces a shearing event as the fluids in the inner tube are pushed from the inner tube into a stagnate and/or more slowly moving treatment fluids of outer tube (or wellbore). The shear rate induced by such a shearing event may depend on a variety of factors, such as, the viscosity of the treatment fluids and the amount of the pressure differential (and/or flow velocities (or flow rates) of the treatment fluids).

In some embodiments, the treatment fluid may be pumped into wellbore via an inner tube that serves to transport the treatment fluid to one or more nozzles that may be used to expose the treatment fluid to an effective shear event to enable polymeric structures to be formed in an annulus that serves as the second conduit.

In some embodiments, the pumping apparatus may be equipped with an electronics package, containing a plurality of sensors. It is contemplated that the various operating parameters sensed would include pressure in the wellbore, temperature changes in the wellbore, and the relative percentage of various components present in the treatment fluids that are being pumped into the wellbore. The flow rates of the fluids at various locations in the wellbore, such as through the perforations and/or the one or more nozzles may be estimated by mathematical calculation. The flow rate of treatment fluids is monitored, and the shear rate the treatment fluids are being exposed to is estimated. The shear rate the treatment fluids are being exposed to may be adjusted by altering the flow rate, if desired. In some embodiments, once an appropriate shear rate has been achieved, at least one parameter of the treatment fluid may be adjusted to trigger consolidation of the one or more polymers.

The application of a predetermined effective shear rate while the one or more polymers is consolidating out of the treatment fluid helps to ensure that the one or more polymers will not merely consolidate and disperse into an undesired morphology in the treatment fluid. The sensing of the flow rate through multiple sensors may assist in determining when that condition has been achieved.

Figure 28:
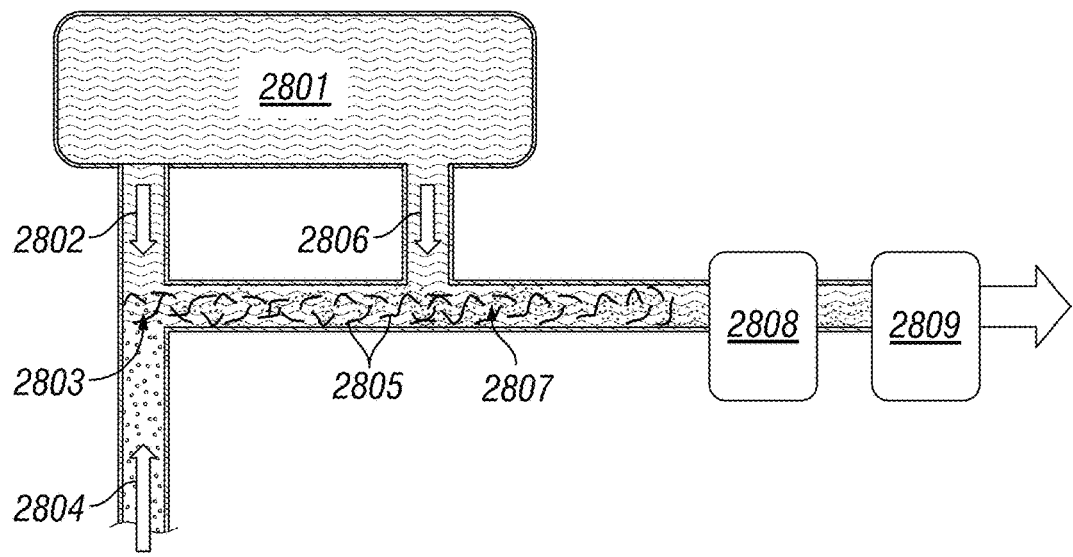
FIG. 28 is a schematic illustration of a possible method of forming polymeric structures on the surface of the subterranean formation.

As discussed above, the polymeric structures may be formed on the surface of the subterranean formation and subsequently placed into the subterranean formation. One example process for the surface creation of the polymeric structures is illustrated in FIG. 28. In FIG. 28, carboxymethyl cellulose (CMC) is shown as an illustrative chemistry, although many of the one or more polymers described above may also be employed with an expectation of similar result. The polymer (CMC) is mixed with water and hydrated in a tank or a continuous mix hydration device 2801, such as, a precision-continuous mix (PCM) unit. All or a portion of the polymer may then be sent via a first stream 2802 (may also be referred to as first treatment fluid) to a mixing arrangement 2803, which governs the morphology of the polymeric structure. At the mixing arrangement 2803, the first stream 2802 is mixed with a second stream 2804 (which may be a surfactant or second polymer—may also be referred to as second treatment fluid) to create consolidated polymeric structures 2805 in the fluid. For the CMC chemistry example, the surfactant or second polymer would typically be cationic materials to complex with the polymer.

Once formed, the polymeric structures 2805 can be combined with additional polymer solution 2806 to increase the fluid viscosity. The resulting suspension of polymeric structures 2807 in a viscous fluid may then be delivered to a blending device 2808, such as a POD blender, as described in U.S. Pat. Nos. 4,453,829, 4,671,665, 4,614,435, 4,838, 701, 4,808,004, 5,046,856, 5,667,012, 7,845,516 and 7,740, 447, and U.S. Patent Application Pub. Nos. 2008/0212397, 2011/0235460 and 2012/0298210, the disclosures of which are incorporated by reference herein in their entirety, where sand or proppant can be added to the fluid. After this, the fluid may then be delivered through the high pressure pumps 2809 to the wellhead (not shown) for flow downhole into the subterranean formation.

Figure 29A:
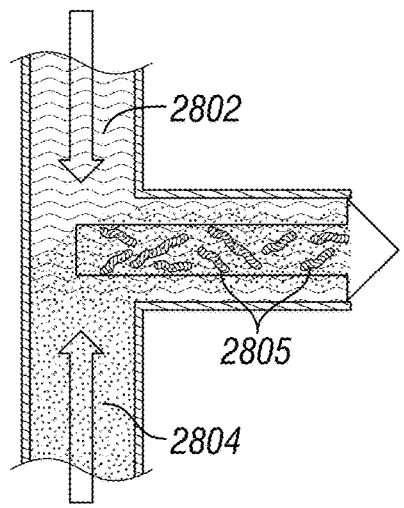
FIG. 29A-D are schematic illustrations of various mixing arrangements to form polymeric structures.
Figure 29B:
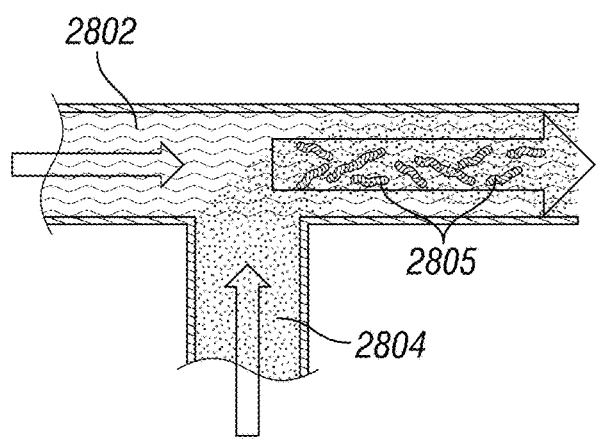

As discussed above, the morphology of the polymeric structure may be influenced by the mixing arrangement 2803 of streams 2802 and 2804 in FIG. 28. FIG. 29A-D illustrates some options for mixing arrangements. FIG. 29A illustrates an impinging tee, where streams 2802 and 2804 mix to form polymeric structures 2805. FIG. 29B illustrates a side stream injection in a tubular, where streams 2802 and 2804 combine to form polymeric structures 2805.

Figure 29C:
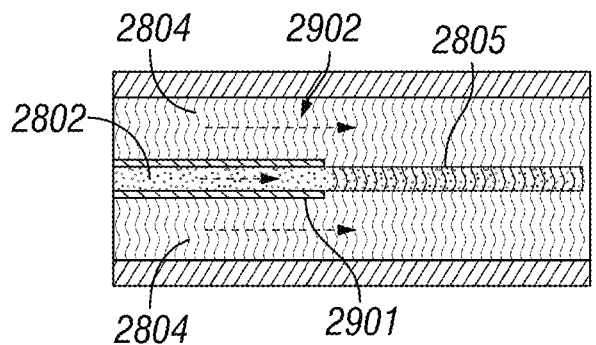

FIG. 29C illustrates the formation of polymeric structures with a nozzle as the mixing arrangement 2803. As shown in FIG. 29C, an inner pipe 2901 may be used to generate polymeric structures 2805 (upon triggering the treatment fluid to undergo a consolidation event, as discussed above). For example, a first treatment fluid 2802 being introduced into the inner pipe 2901 may contain the one or more polymers, and a second treatment fluid 2804 being introduced into the annulus 2902 of outer pipe 2903 may comprise a triggering additive (to trigger the consolidation of the one or more polymers upon the coannular mixing of the first and second treatment fluids). In such embodiments, the above-mentioned first treatment fluid 2802 may be introduced into the annulus 2902 and the above-mentioned second treatment fluid 2804 may be introduced into the inner pipe 2901 (not shown).

Figure 29D:
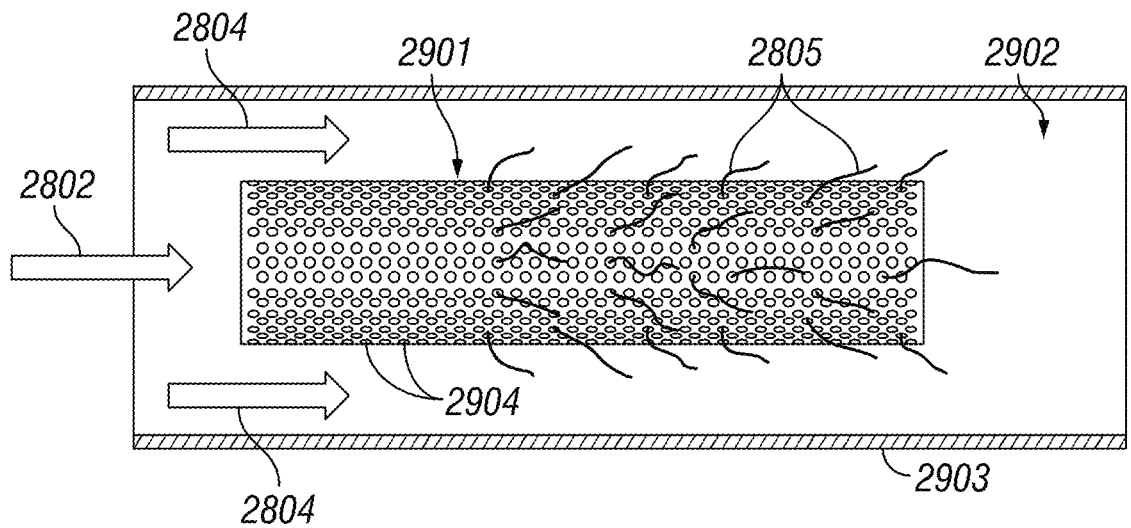

FIG. 29D illustrates the formation of polymeric structures with a perforated nozzle as the mixing arrangement 2803. A similar embodiment is described above in FIG. 4. In some embodiments, exposing the treatment fluid to a shear event may involve pumping the one or more fluids via a pipe having a perforated portion, as illustrated in FIG. 29D. For example, as shown in FIG. 29D, an inner pipe 2901 comprising a plurality of openings or perforations 2904 may be used to generate polymeric structures 2805 (upon triggering the treatment fluid to undergo a consolidation event, as discussed above). For example, a first treatment fluid 2802 being introduced into the inner pipe 2901 may contain the one or more polymers, and a second treatment fluid 2804 being introduced into the annulus 2902 of the outer pipe 2903 may comprise a triggering additive (to trigger the consolidation of the one or more polymers upon the coannular mixing of the first and second treatment fluids). In such embodiments, the above-mentioned first treatment fluid 2802 may be introduced into the annulus 2902 and the above-mentioned second treatment fluid 2804 may be introduced into the inner pipe 2901 (not shown).

Figure 30:
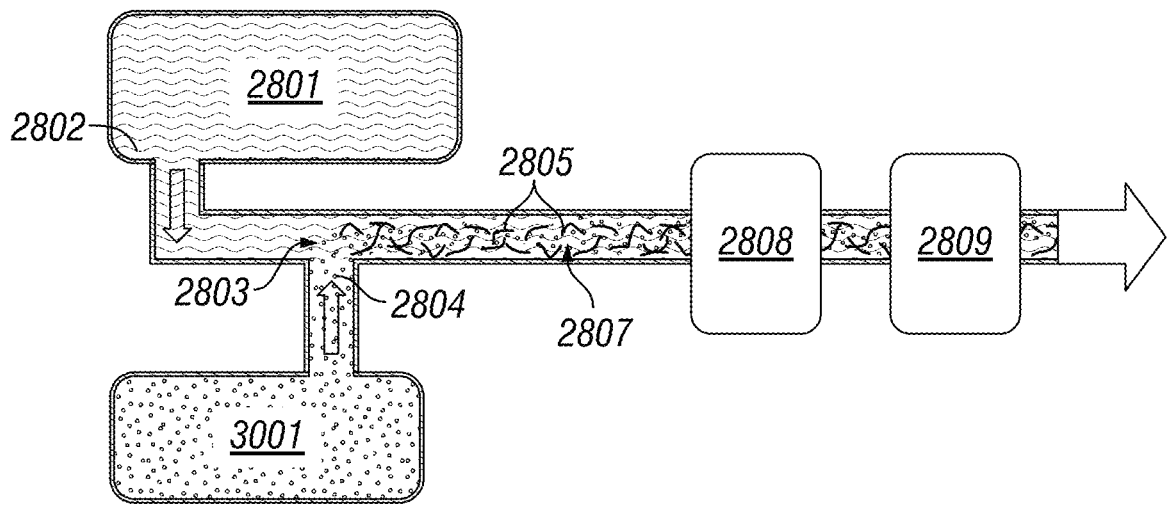
FIG. 30 is a schematic illustration of a possible method of forming polymeric structures on the surface of the subterranean formation.

Another example process for the surface creation of the polymeric structures is illustrated in FIG. 30. In FIG. 30, sodium alginate is shown as an illustrative chemistry, although many of the one or more polymers described above may also be employed with an expectation of similar result. The first polymer (sodium alginate) is mixed with water and hydrated in a tank or a continuous mix hydration device 2801, such as, a precision-continuous mix (PCM) unit. The second polymer (guar) is mixed with water and hydrated in a tank or a continuous mix hydration device 3001, such as, a precision-continuous mix (PCM) unit. All or a portion of the first polymer may then be sent via a first stream 2802 (may also be referred to as first treatment fluid) to a mixing arrangement 2803, which governs the morphology of the polymeric structure. At the mixing arrangement 2803, the first stream 2802 is mixed with a second stream 2804 containing the triggering additive and a second polymer (may also be referred to as second treatment fluid) to create consolidated polymeric structures 2805 in the fluid. For the sodium alginate chemistry example, the second polymer would typically be a viscosifying polymer that would not react with the first polymer, such as a polysaccharide like guar. The resulting suspension of polymeric structures 2807 in a viscous fluid may then be delivered to a blending device 2808, such as a POD blender where sand or proppant can be added to the fluid. After this, the fluid may then be delivered through the high pressure pumps 2809 to the wellhead (not shown) for flow downhole into the subterranean formation. Furthermore, the one or more polymers in the first treatment fluid may be referred to as "shape polymer", which is the polymer that may undergo consolidation. The triggering additive may also be referred to as a "viscosifying polymer" and is essentially inert under the wellbore conditions such that it does not become a part of the polymeric structure.

Selection of the One or More Polymers

Selection of the one or more polymers for use in the methods of the present disclosure may depend on many factors, such as the anticipated changes to the treatment fluid parameters and/or composition during a treatment operation in order to induce consolidation by one or more of the above-mentioned consolidation events. Additional factors include the desired characteristics of the ultimate polymeric structure being formed, including its chemistry, its dimensions and morphology, and its desired concentration, among other factors, including the specific treatment operation and/or the way in which the polymeric structure will be used.

The selection of the one or more polymers may also take into account the nature of the subterranean operation, for example, whether or not fluid loss control is desired, the temperature, the nature of the formation, and the time desired before a break occurs and/or the time desired by which a break has occurred.

In some embodiments, the one or more polymers for use in the methods of the present disclosure may be selected such that the chemical comprised in the treatment fluid may have predetermined condition, such as temperature, pH, salinity, ionic concentration, solvent composition, etc., at which the one or more polymers consolidates out of the treatment fluid. In other words, one or more polymers suitable for use in the methods of the present disclosure may be selected to have defined chemical and/or physical conditions (that can be replicated downhole) under which it consolidates.

In some embodiments, the consolidation of the one or more polymers, and/or a reaction product thereof, may be selected because the particular one or more polymers may be controlled by adjusting a single chemical or physical condition alone, such as by adjusting the temperature, salinity, ionic concentration (for example, formation of polyelectrolyte complexes), pH, hydrophobicity, solvent composition, or molecular weight (for example, cross-linking reactions). In such embodiments, methods of the present disclosure may comprise applying a shearing force of a predetermined shear rate to a treatment fluid present in a subterranean formation while the one or more polymers is consolidating out of the treatment fluid (in response to the adjustment of the single chemical condition) in order to generate elongated (fiber-like) consolidates in situ.

In embodiments, the treatment fluid and the one or more polymers may be selected to avoid premature consolidation. Then, when it is desired to consolidate the one or more polymers the environmental conditions may be altered, such as by placing a second (or subsequent) treatment fluid, and/or and additional component, to modify treatment fluid such that conditions under which the one or more polymers will consolidate are generated.

In some embodiments, a component in the treatment fluid pumped into the wellbore, or an additional component added to the treatment fluid downhole, triggers the consolidation of the one or more polymers, and/or a reaction product thereof. This component and/or additional component may optionally be coated to slow the initiation of the consolidation of the one or more polymers. Suitable coatings are known and may include polycaprolate (a copolymer of glycolide and ε-caprolactone), and calcium stearate, both of which are hydrophobic. Generating a hydrophobic layer on the surface of the component and/or additional component (by any means) may also be used delays the consolidation of the one or more polymers. The term "coating", as described herein may refer to encapsulation or simply to changing the surface by chemical reaction or by forming or adding a thin film of another material. Any other suitable method for delaying the consolidation of the one or more polymers may also be employed, as desired.

In embodiments, the one or more polymers may be selected such that it dissolves in the treatment fluid under downhole conditions, but may be triggered to consolidate by one or more of the means described above. The concentration of the one or more polymers that is dissolved in the initial treatment fluid may depend on a number of factors, such as the particular chemical and physical make-up of the one or more polymers, and the end use of the polymeric structures. In embodiments, the treatment fluids used in the methods of the present disclosure may contain the one or more polymers in any desired amount that is sufficient to form the desired concentration of fiber-like consolidate downhole. In some embodiments, the amount of fiber-like consolidate may be in a range of from about 0.01 wt. % to about 10 wt. %, or in a range of from about 0.01 wt. % to about 4.0 wt. %, such as in a range of from about 0.05 wt. % to about 2.0 wt. %. In embodiments where proppant is present, the amount of fiber-like consolidate may be in a range of from about 1.5 g/L to about 3.0 g/L (or in a range of from about 2.2 g/L to about 2.6 g/L) for proppant loadings of about 0.12 to about 0.36 kg/L (about 1 to about 3 PPA); in a range of from about 2.5 g/L to about 4.5 g/L (or in a range of from about 3.4 g/L to about 3.8 g/L) for proppant loadings of about 0.36 to about 0.6 kg/L (about 3 to about 5 PPA); and in a range of from about 4.0 g/L to about 5.8 g/L (or in a range of from about 4.6 g/L to about 5.0 g/L) for proppant loadings of over 0.6 kg/L (about 5 PPA).

In embodiments, the treatment fluids used in the methods of the present disclosure may contain the dissolved one or more polymers in amounts of from about 0.1% to about 20% by weight of the treatment fluid, or in amounts of from about 0.5% to about 10% by weight of the treatment fluid, and in amounts of from about 1% to about 6% by weight of the treatment fluid. In some embodiments, the treatment fluids used in the methods of the present disclosure may contain the one or more polymers, and the one or more polymers may be present in the treatment fluid in amounts of from about 0.1% to about 20% by weight of the treatment fluid, or in amounts of from about 0.5% to about 10% by weight of the treatment fluid, and in amounts of from about 1% to about 6% by weight of the treatment fluid. In some embodiments, the one or more polymers may be added to the treatment fluid downhole, while its concentration in the surface prepared treatment fluid is effectively zero.

In some embodiments, most of the one or more polymers initially dissolved and/or dispersed in the treatment fluid arrives at the target treatment zone or target subterranean formation after consolidating and forming a polymeric structure (after being exposed to a predetermined shear rate), for example, at least about 0.1% by weight of the one or more polymers initially dissolved and/or dispersed in the treatment fluid, or at least about 1.0% by weight of the one or more polymers initially dissolved and/or dispersed in the treatment fluid, or at least about 10.0% by weight of the one or more polymers initially dissolved in the treatment fluid, may arrive at the target treatment zone or target subterranean formation in a polymeric structure formed while being exposed to a predetermined shear rate.

In some embodiments, the one or more polymers may be added separately to the treatment fluid, after the treatment fluid has been pumped downhole. The concentration of the one or more polymers that is added to the treatment fluid downhole may depend on a number of factors, such as the particular chemical and physical properties of the one or more polymers, and the end use of the polymeric structures.

The one or more polymers dissolved in the treatment fluid may be composed of a single monodisperse polymer, a single polydisperse polymer, or the one or more polymers dissolved in the treatment fluid may include a mixture of two or more polydisperse polymers, where at least one of the polymers may be triggered to be insoluble in the solvent or mixture of solvents of the treatment fluid. At least one of the dissolvable polymers used in the treatment fluid should be able to exist in a solid and/or gel form under conditions where the polymer is not dissolved.

Initially, the one or more polymers may be dissolved in the treatment fluid by altering conditions or parameters of the treatment fluid such as temperature, salinity, ionic concentration (formation of polyelectrolyte complexes), pH, hydrophobicity, solvent composition, and/or molecular weight (of the one or more polymers, such as a cross-linking reactions) to ensure the one or more polymers are able to fulfill its soluble-state function, such as for example, mixing with other components in the treatment fluid and being introduced to the wellbore and/or subterranean formation.

The one or more polymers may be natural polymers, synthetic polymers, polyelectrolytes or biopolymers (or derivatives thereof) or mixtures thereof that comprise a crosslinkable moiety, for example, substituted galactomannans, guar gums, high-molecular weight polysaccharides composed of mannose and galactose sugars, or guar derivatives, such as hydrophobically modified guars, guar-containing compounds, and synthetic polymers. Suitable polymer chemical entities may comprise a guar gum, a locust bean gum, a tara gum, a honey locust gum, a tamarind gum, a karaya gum, an arabic gum, a ghatti gum, a tragacanth gum, a carrageenen, a succinoglycan, a xanthan, a dibutan, scleroglucan, alginates, a hydroxylethyl guar, a hydroxypropyl guar (HPG), a carboxymethylhydroxyethyl guar, a carboxymethylhydroxypropyl guar (CMHPG), polyanionic cellulose (PAC), a carboxyalkyl cellulose, such as carboxymethyl cellulose (CMC) or carboxyethyl cellulose, an alkylcarboxyalkyl cellulose, an alkyl cellulose, an alkylhydroxyalkyl cellulose, a carboxyalkyl cellulose ether, a hydroxyethylcellulose (HEC), hydroxypropylcellulose (HPC), a carboxymethylhydroxyethyl cellulose (CMHEC), a carboxymethyl starch, a copolymer of 2-acrylamido-2methyl-propane sulfonic acid and acrylamide, a terpolymer of 2-acrylamido-2methyl-propane sulfonic acid, acrylic acid, acrylamide, or derivative thereof. The polymer may be a cationic polymer such as chitosan, cationic guar, gelatin, collagen, or other polypeptide, polyethyleneimine (PEI), diallyldimethylammonium chloride (DADMAC), polyvinyl pyrrolidone (PVP), polyvinylamine (PVA), or other polyamine. The polymer may also be a synthetic polymer such as, for example, a polyacrylamide including partially hydrolyzed polyacrylamide (PHPA); polyvinyl alcohol; polyethylene glycol; polypropylene glycol; polyacrylic acid or polymethacrylic acid; as well as copolymers and mixtures thereof.

In embodiments, the one or more polymers may present at about 0.01% to about 4.0% by weight based on the total weight of the treatment fluid, such as at about 0.10% to about 2.0% by weight based on the total weight of the treatment fluid.

In embodiments, the one or more polymers may be functionalized, such as hydrophobically modified to inhibit or delay solubilization and/or consolidation. For example, in embodiments where the one or more polymers of the one or more polymers may include a polyol, the polyol may be hydrophobically modified by including hydrocarbyl substituents, such as, for example, alkyl, aryl, alkaryl or aralkyl moieties and/or side chains having from about 2 to about 30 carbon atoms, or about 4 to about 20 carbon atoms.

In embodiments, the one or more polymers may be modified to include carboxylic acid groups, thiol groups, paraffin groups, silane groups, sulfuric acid groups, acetoacetylate groups, polyethylene oxide groups, and/or quaternary amine groups. Such modifications may be used to influence one or more properties of the polymer, which may be used to adjust the solubilization and/or consolidation properties of the polymer. For example, such modifications may be used to modify the one or more polymer's sensitivity to salinity, pH, ionic strength and/or solvent compositions. Such modifications may also introduce crosslinking functionalities (such as hydroxyl groups and silanol groups, which are chelates that can crosslink with common crosslinkers). Conventional methods of making such modifications are known.

In the methods of the present disclosure, after the one or more polymers has fulfilled its soluble-state function, the conditions under which at least one of the one or more polymers were dissolved are altered such that at least one of the one or more polymers consolidates. During this consolidation process the treatment fluid in which the one or more polymers are dissolved is exposed to a predetermined shear rate to form a polymeric structure in situ. After this polymeric structure (also referred to herein as a "fiber-like consolidate", unless otherwise specified) is formed in situ, the polymeric structure (comprising the one or more polymers) may perform its solid-form function (or gel-form function) as a fiber-like component of a treatment fluid, such as, for example, a fluid loss control pill, a water control treatment fluid, a scale inhibition treatment fluid, a fracturing fluid, a gravel packing fluid, a drilling fluid, a drill-in fluid, or cementing fluid.

The methods of the present disclosure (such as drilling, fracturing, cementing, or completion methods) may include a composition containing one or more polymers that may be triggered to undergo a consolidation event such that the consolidate that is formed is a polymeric structure (which forms in situ when the treatment fluid is exposed to a predetermined effective shear rate during the consolidation event), but otherwise use conventional techniques known in the art.

In some embodiments, the formation of the polymeric structures (generated by the methods of the present disclosure) is reversible. The resulting dissolved chemical entities may be used as a breaker for various crosslinked systems, such as crosslinked guar based or other polymer-viscosified fluids. For example, the action of the re-dissolved one or more polymers may effectively act to take borate, titanate, zirconate and similar ions away from the guar based molecules, thereby reducing the viscosity of the crosslinked polymer to that of a linear gel.

While the methods and treatment fluids of the present disclosure are described herein as comprising the above-mentioned components, it should be understood that the methods and fluids of the present disclosure may optionally comprise other additional materials, such as the materials and additional components discussed below, which relate to various methods of forming polymeric structures from the one or more polymers.

As discussed in more detail below, after the polymeric structure is formed it may perform its intended solid-state function and/or application, for example, as a fiber-like component in a drilling fluid, a fracturing fluid, cement slurry, or a completion fluid. Such materials are described in U.S. Pat. Nos. 5,330,005, 5,439,055; 5,501,275; 6,172,011; and 6,419,019, the disclosures of which are hereby incorporated by reference in their entireties. Furthermore, any additives normally used in such treatments may be included, provided that they are compatible with the other components and the desired results of the treatment. Such additives may include anti-oxidants, crosslinkers, corrosion inhibitors, delay agents, biocides, buffers, fluid loss additives, etc.

Treatment Fluid

As discussed above, the treatment fluid carrying the one or more polymers may be any well treatment fluid, such as a fluid loss control pill, a water control treatment fluid, a scale inhibition treatment fluid, a fracturing fluid, a gravel packing fluid, a drilling fluid, and a drill-in fluid. The carrier solvent for the treatment fluid may be a pure solvent or a mixture. Suitable solvents for use with the methods of the present disclosure, such as for forming the treatment fluids disclosed herein, may be aqueous or organic based. Aqueous solvents may include at least one of fresh water, sea water, brine, mixtures of water and water-soluble organic compounds and mixtures thereof. Organic solvents may include any organic solvent that is able to dissolve or suspend the various components, such as the chemical entities and/or components of the treatment fluid.

Suitable organic solvents may include, for example, alcohols, glycols, esters, ketones, nitrites, amides, amines, cyclic ethers, glycol ethers, acetone, acetonitrile, 1-butanol, 2-butanol, 2-butanone, t-butyl alcohol, cyclohexane, diethyl ether, diethylene glycol, diethylene glycol dimethyl ether, 1,2-dimethoxy-ethane (DME), dimethylether, dibutylether, dimethyl sulfoxide (DMSO), dioxane, ethanol, ethyl acetate, ethylene glycol, glycerin, heptanes, hexamethylphosphorous triamide (HMPT), hexane, methanol, methyl t-butyl ether (MTBE), N-methyl-2-pyrrolidinone (NMP), nitromethane, pentane, petroleum ether (ligroine), 1-propanol, 2-propanol, pyridine, tetrahydrofuran (THF), toluene, triethyl amine, o-xylene, m-xylene, p-xylene, ethylene glycol monobutyl ether, polyglycol ethers, pyrrolidones, N-(alkyl or cycloalkyl)-2-pyrrolidones, N-alkyl piperidones, N,N-dialkyl alkanolamides, N,N,N',N'-tetra alkyl ureas, dialkylsulfoxides, pyridines, hexaalkylphosphoric triamides, 1,3-dimethyl-2-imidazolidinone, nitroalkanes, nitro-compounds of aromatic hydrocarbons, sulfolanes, butyrolactones, alkylene carbonates, alkyl carbonates, N-(alkyl or cycloalkyl)-2-pyrrolidones, pyridine and alkylpyridines, diethylether, dimethoxyethane, methyl formate, ethyl formate, methyl propionate, acetonitrile, benzonitrile, dimethylformamide, N-methylpyrrolidone, ethylene carbonate, dimethyl carbonate, propylene carbonate, diethyl carbonate, ethylmethyl carbonate, dibutyl carbonate, lactones, nitromethane, nitrobenzene sulfones, tetrahydrofuran, dioxane, dioxolane, methyltetrahydrofuran, dimethylsulfone, tetramethylene sulfone, diesel oil, kerosene, paraffinic oil, crude oil, liquefied petroleum gas (LPG), mineral oil, biodiesel, vegetable oil, animal oil, aromatic petroleum cuts, terpenes, mixtures thereof.

While the treatment fluids of the present disclosure are described herein as comprising the above-mentioned components, it should be understood that the fluids of the present disclosure may optionally comprise other chemically different materials. In embodiments, the fluid may further comprise stabilizing agents, surfactants, diverting agents, or other additives. Additionally, the treatment fluid may comprise a mixture various other crosslinking agents, and/or other additives, such as fibers or fillers, provided that the other components chosen for the mixture are compatible with the intended use of forming a polymeric structure. In embodiments, the treatment fluid of the present disclosure may further comprise one or more components such as, for example, a gel breaker, a buffer, a proppant, a clay stabilizer, a gel stabilizer, a chelating agent, an oxygen scavenger and a bactericide. Furthermore, the treatment fluid or treatment fluid may include buffers, pH control agents, and various other additives added to promote the stability or the functionality of the fluid. The treatment fluid or treatment fluid may be based on an aqueous or non-aqueous solution. The components of the treatment fluid or treatment fluid may be selected such that they may or may not react with the subterranean formation that is to be treated.

In this regard, the treatment fluid may include components independently selected from any solids, liquids, gases, and combinations thereof, such as slurries, gas-saturated or non-gas-saturated liquids, mixtures of two or more miscible or immiscible liquids, and the like, as long as such additional components allow for the formation of a polymeric structure. For example, the fluid or treatment fluid may comprise organic chemicals, inorganic chemicals, and any combinations thereof. Organic chemicals may be monomeric, oligomeric, polymeric, crosslinked, and combinations, while polymers may be thermoplastic, thermosetting, moisture setting, elastomeric, and the like. Inorganic chemicals may be metals, alkaline and alkaline earth chemicals, minerals, and the like. Fibrous materials may also be included in the fluid or treatment fluid. Suitable fibrous materials may be woven or nonwoven, and may be comprised of organic fibers, inorganic fibers, mixtures thereof and combinations thereof.

Surfactants can be added to promote dispersion or emulsification of components of the fluid, or to provide foaming of the crosslinked component upon its formation downhole. Suitable surfactants include alkyl polyethylene oxide sulfates, alkyl alkylolamine sulfates, modified ether alcohol sulfate sodium salts, or sodium lauryl sulfate, among others. Any surfactant which aids the dispersion and/or stabilization of a gas component in the fluid to form an energized fluid can be used. Viscoelastic surfactants, such as those described in U.S. Pat. Nos. 6,703,352, 6,239,183, 6,506,710, 7,303,018 and 6,482,866, each of which are incorporated by reference herein in their entirety, are also suitable for use in fluids in some embodiments. Examples of suitable surfactants also include, but are not limited to, amphoteric surfactants or zwitterionic surfactants. Alkyl betaines, alkyl amido betaines, alkyl imidazolines, alkyl amine oxides and alkyl quaternary ammonium carboxylates are some examples of zwitterionic surfactants. An example of a useful surfactant is the amphoteric alkyl amine contained in the surfactant solution AQUAT 944® (available from Baker Petrolite of Sugar Land, Tex.). A surfactant may be added to the fluid in an amount in the range of about 0.01 wt. % to about 10 wt. %, such as about 0.1 wt. % to about 2 wt. % based upon total weight of the treatment fluid.

Charge screening surfactants may be employed. In some embodiments, the anionic surfactants such as alkyl carboxylates, alkyl ether carboxylates, alkyl sulfates, alkyl ether sulfates, alkyl sulfonates, α-olefin sulfonates, alkyl ether sulfates, alkyl phosphates and alkyl ether phosphates may be used. Anionic surfactants have a negatively charged moiety and a hydrophobic or aliphatic tail, and can be used to charge screen cationic polymers. Examples of suitable ionic surfactants also include, but are not limited to, cationic surfactants such as alkyl amines, alkyl diamines, alkyl ether amines, alkyl quaternary ammonium, dialkyl quaternary ammonium and ester quaternary ammonium compounds. Cationic surfactants have a positively charged moiety and a hydrophobic or aliphatic tail, and can be used to charge screen anionic polymers such as CMHPG. In the same manner, a charged surfactant can also be employed to form polymer-surfactant complexes as a method for generating consolidated structures.

The treatment fluids described herein may also include one or more inorganic salts. Examples of these salts include water-soluble potassium, sodium, and ammonium salts, such as potassium chloride, ammonium chloride or tetramethyl ammonium chloride (TMAC). Additionally, sodium chloride, calcium chloride, potassium chloride, sodium bromide, calcium bromide, potassium bromide, sodium sulfate, calcium sulfate, sodium phosphate, calcium phosphate, sodium nitrate, calcium nitrate, cesium chloride, cesium sulfate, cesium phosphate, cesium nitrate, cesium bromide, potassium sulfate, potassium phosphate, potassium nitrate salts may also be used. Any mixtures of the inorganic salts may be used as well. The inorganic salt may be added to the fluid in an amount of from about 0.01 wt. % to about 80 wt. %, from about 0.1 wt. % to about 20 wt. %, from about 0.1 wt. % to about 10 wt. %, based upon total weight of the treatment fluid.

In other embodiments, the surfactant is a blend of two or more of the surfactants described above, or a blend of any of the surfactant or surfactants described above with one or more nonionic surfactants. Examples of suitable nonionic surfactants include, but are not limited to, alkyl alcohol ethoxylates, alkyl phenol ethoxylates, alkyl acid ethoxylates, alkyl amine ethoxylates, sorbitan alkanoates and ethoxylated sorbitan alkanoates. Any effective amount of surfactant or blend of surfactants may be used in aqueous energized fluids.

Friction reducers may also be incorporated in any fluid embodiment. Any suitable friction reducer polymer, such as polyacrylamide and copolymers, partially hydrolyzed polyacrylamide, poly(2-acrylamido-2-methyl-1-propane sulfonic acid) (polyAMPS), and polyethylene oxide may be used. Commercial drag reducing chemicals such as those sold by Conoco Inc. under the trademark "CDR" as described in U.S. Pat. No. 3,692,676 or drag reducers such as those sold by Chemlink designated under the trademarks FLO1003, FLO1004, FLO1005 and FLO1008 have also been found to be effective. These polymeric species added as friction reducers or viscosity index improvers may also act as excellent fluid loss additives reducing or even eliminating the use of conventional fluid loss additives. Latex resins or polymer emulsions may be incorporated as fluid loss additives. Shear recovery agents may also be used in embodiments.

Embodiments may also include proppant particles that are substantially insoluble in the fluids of the formation. Proppant particles carried by the treatment fluid remain in the fracture created, thus propping open the fracture when the fracturing pressure is released and the well is put into production. Suitable proppant materials include, but are not limited to, sand, walnut shells, sintered bauxite, glass beads, ceramic materials, naturally occurring materials, or similar materials. Mixtures of proppants can be used as well. If sand is used, it may be from about 20 to about 100 U.S. Standard Mesh in size. With synthetic proppants, mesh sizes about 8 or greater may be used. Naturally occurring materials may be underived and/or unprocessed naturally occurring materials, as well as materials based on naturally occurring materials that have been processed and/or derived. Suitable examples of naturally occurring particulate materials for use as proppants include: ground or crushed shells of nuts such as walnut, coconut, pecan, almond, ivory nut, brazil nut, etc.; ground or crushed seed shells (including fruit pits) of seeds of fruits such as plum, olive, peach, cherry, apricot, etc.; ground or crushed seed shells of other plants such as maize (e.g., corn cobs or corn kernels), etc.; processed wood materials such as those derived from woods such as oak, hickory, walnut, poplar, mahogany, etc., including such woods that have been processed by grinding, chipping, or other form of particulation, processing, etc.

The concentration of proppant in the fluid can be any concentration known in the art. For example, the concentration of proppant in the fluid may be in the range of from about 0.03 to about 3 kilograms of proppant added per liter of liquid phase. Also, any of the proppant particles can further be coated with a resin to potentially improve the strength, clustering ability, and flow back properties of the proppant.

A fiber component may be included in the fluids to achieve a variety of properties including improving particle suspension, and particle transport capabilities, and gas phase stability. Fibers used may be hydrophilic or hydrophobic in nature. Fibers can be any fibrous material, such as, for example, natural organic fibers, comminuted plant materials, synthetic polymer fibers (by non-limiting example polyester, polyaramide, polyamide, novoloid or a novoloid-type polymer), fibrillated synthetic organic fibers, ceramic fibers, inorganic fibers, metal fibers, metal filaments, carbon fibers, glass fibers, ceramic fibers, natural polymer fibers, and any mixtures thereof. Particularly useful fibers are polyester fibers coated to be highly hydrophilic, such as, but not limited to, DACRON® polyethylene terephthalate (PET) fibers available from Invista Corp. Wichita, Kans., USA, 67220. Other examples of useful fibers include, but are not limited to, polylactic acid polyester fibers, polyglycolic acid polyester fibers, polyvinyl alcohol fibers, and the like. When used in fluids, the fiber component may be included at concentrations from about 1 to about 15 grams per liter of the liquid phase of the fluid, such as a concentration of fibers from about 2 to about 12 grams per liter of liquid, or from about 2 to about 10 grams per liter of liquid.

Embodiments may further use fluids containing other additives and chemicals that are known to be commonly used in oilfield applications by those skilled in the art. These include materials such as surfactants in addition to those mentioned hereinabove, breaker aids in addition to those mentioned hereinabove, oxygen scavengers, alcohol stabilizers, scale inhibitors, corrosion inhibitors, fluid-loss additives, bactericides and biocides such as 2,2-dibromo-3-nitrilopropionamine or glutaraldehyde, and the like. Also, they may include a co-surfactant to optimize viscosity or to minimize the formation of stable emulsions that contain components of crude oil.

As used herein, the term "alcohol stabilizer" is used in reference to a certain group of organic molecules substantially or completely soluble in water containing at least one hydroxyl group, which are susceptible of providing thermal stability and long term shelf life stability to aqueous zirconium complexes. Examples of organic molecules referred as "alcohol stabilizers" include but are not limited to methanol, ethanol, n-propanol, isopropanol, n-butanol, tert-butanol, ethyleneglycol monomethyl ether and the like.

Consolidation Event: Solvent Change Consolidation

In embodiments, a solvent change consolidation event may be used in the method for treating a subterranean formation of the present disclosure. Such methods may include contacting a treatment fluid comprising a solution of one or more polymers with a solvent that triggers the consolidation of at least one of the one or more of the polymers while shearing the polymer solution, thereby forming polymeric structures in the fluid anywhere between the surface mixing equipment and the downhole formation. In embodiments, the treatment fluid carrying the polymer solution may be a drilling fluid, a fracturing fluid, cement slurry, or a completion fluid. The consolidating solvent may be a pure solvent or a mixture, including one of more of the aqueous and/or organic solvents mentioned above. The polymer solution comprised in the treatment fluid may be composed of a single polymer, or the polymer solution may include a mixture of two or more polymers, where at least one of them is insoluble in the subsequently added solvent or mixture of solvents.

In some embodiments, the methods of the present disclosure may include a first treatment fluid comprising one or more polymers that are dissolved in a first solvent. Optionally, this first treatment fluid may be exposed to an ongoing shear event before the consolidation event is initiated. In embodiments, the consolidation event may be initiated by adding (and/or mixing) a second treatment fluid comprising a second solvent (second treatment fluid or consolidating agent) that renders at least one of the one or more polymers of the first treatment fluid insoluble. In embodiments, the event that triggers the consolidation of the one or more polymers may include placing such a second solvent (second treatment fluid or consolidating agent), which may be added at the surface, mixed at the surface, added downhole and/or mixed downhole with the first treatment fluid.

In some embodiments, the methods of the present disclosure may include a first treatment fluid that does not comprise one or more polymers. Instead, the composition of the first treatment fluid is selected such that when it is mixed with a second treatment fluid (containing a dissolved one or more polymers), the dissolved at least one polymer of the one or more polymers in the second treatment fluid consolidates. Optionally, the first treatment fluid may be exposed to an ongoing shear event before the consolidation event is initiated. The second treatment fluid may be introduced into the first treatment fluid by adding (and/or mixing) either at the surface or downhole.

In some embodiments, the first and/or second treatment fluids may have any suitable viscosity, such as a viscosity of from about 1 cP to about 1,000 cP (or from about 10 cP to about 100 cP) at the treating temperature, which may range from a surface temperature to a bottom-hole static (reservoir) temperature, such as from about −40° C. to about 150° C., or from about 10° C. to about 120° C., or from about 25° C. to about 100° C., and any effective shear rate may be used during the application of a shear event; in some embodiments, the shear rate that is observed during the application of a shear event to the above-mentioned fluid(s) may be in a range of from about 1 $s^{-1}$ to about 100,000 $s^{-1}$, such as a shear rate in a range of from about 100 $s^{-1}$ to about 10,000 $s^{-1}$, or a shear rate in a range of from about 500 $s^{-1}$ to about 5,000 $s^{-1}$ as measured by common methods. The magnitude of the effective shear rate that may be used to form polymeric structures will depend on the composition of the treatment fluid.

In some embodiments, the total amount of the polymer in solution in the treatment fluid may be in the range of from about 0.1 to about 10% by weight of the treatment fluid, such as in the range of from about 0.2 to about 5% by weight of the treatment fluid, or in the range of from about 0.5 to about 1.5% by weight of polymer solution.

Polymers suitable for solvent change consolidation may be synthetic or naturally-occurring. Some examples of polymer classes include polysaccharides and their derivatives, polyamides, polyethers, polyesters and polyolefins. Examples of consolidating solvents for such polymers include water, various alcohols such as methanol, ethanol, and isopropanol, and other organic water-miscible solvents mentioned above.

For example, isopropanol-water is a suitable solvent pair to consolidate guar from a water solution. A ratio of about 1:5 isopropanol:water is suitable to start the consolidation of guar. Diethylene glycol dimethyl ether (diglyme)-water is a suitable solvent pair to consolidate polylactic acid from a PLA solution in pure diglyme. A ratio of about 1:10 diglyme:water is suitable to start the consolidation of polylactic acid.

Consolidation Event: pH Change Consolidation

In some embodiments, the treatment fluid may comprise one or more polymers, where at least one of the one or more polymers is a pH-sensitive polymer that is dissolved in the treatment fluid comprising a first solvent capable of dissolving the pH-sensitive polymer. In such embodiments, the triggering of the consolidation event may be initiated by either placing a pH triggering agent (such as an additive that adjusts the pH of the treatment fluid and/or second solvent having a different pH) that triggers the consolidation of one or more of the polymers through a change in the pH of the treatment fluid. In some embodiments, the pH change that triggers the consolidation of one or more of the polymers is reversible such that returning the pH of the treatment fluid to its initial value will re-dissolve the one or more polymers.

Shearing the treatment fluid at an effective shear rate while adjusting the pH to a predetermined pH that results in the consolidation of the one or more polymers forms the polymeric structure of the one or more polymers. In some embodiments, the treatment fluid may have any suitable viscosity, such as a viscosity of from about 1 cP to about 1,000 cP (or from about 10 cP to about 100 cP) at the treating temperature, which may range from a surface temperature to a bottom-hole static (reservoir) temperature, such as from about −40° C. to about 150° C., or from about 10° C. to about 120° C., or from about 25° C. to about 100° C., and any effective shear rate may be used during the application of a shear event; in some embodiments, the shear rate that is observed during the application of a shear event to the above-mentioned fluid may be in a range of from about $1\ s^{-1}$ to about $100,000\ s^{-1}$, such as a shear rate in a range of from about $100\ s^{-1}$ to about $10,000\ s^{-1}$, or a shear rate in a range of from about $500\ s^{-1}$ to about $5,000\ s^{-1}$ as measured by common methods. The magnitude of the effective shear rate that may be used to form polymeric structures will depend on the composition of the treatment fluid. For example, in embodiments where consolidation is induced by a pH change, adding a polymer, such as chitosan, to a consolidating bath under a very low shear rate, such as less than about $10\ s^{-1}$ does not afford a polymeric structure; rather a large agglomerate of polymer consolidated, which does not constitute a polymeric structure of the present disclosure.

Polymeric structures (also referred to herein as a "fiber-like consolidate", unless otherwise specified) may be formed in the treatment fluid anywhere including the surface mixing equipment and the downhole formation to be treated. In some embodiments, the shear rate applied to the treatment fluid comprising the pH-sensitive polymer solution may be adjusted as desired to form a predetermined size of polymeric structures in the treatment fluid.

Suitable pH-sensitive polymers include those that exhibit pH dependent solubility. Examples are alginate, chitosan, cellulose acetate phthalate, cellulose acetate trimellitate, hydroxypropylmethylcellulose phthalate, polyacrylic acid, poly(methyl methacrylate) copolymers, polyamines, and shellac. Examples of polymer classes that can be mixed with a pH-sensitive polymer include neutral polysaccharides, polyethers, polyacetals, polyamides and polyesters.

Suitable pH control agents, if employed in the treatment fluid, may include sodium, potassium and ammonium sesquicarbonates, oxalates, carbonates, hydroxides, bicarbonates, acids and organic carboxylates such as acetates and polyacetates. Examples are sodium sesquicarbonate, sodium carbonate, and sodium hydroxide. Soluble oxides, including slowly soluble oxides such as MgO, may also be used. Amines and oligomeric amines, such as alkyl amines, hydroxyalkyl amines, anilines, pyridines, pyrimidines, quinolines, and pyrrolidines for example triethanolamine and tetraethylenepentamine, may also be used.

Consolidation Event: Crosslink Induced Consolidation

In some embodiments, the treatment fluid may comprise one or more polymers, such as cross-linkable polymers, dissolved in a solvent. In such embodiments, the triggering of the consolidation event may be initiated by either placing a component and/or second solution that triggers the consolidation of one or more of the polymers by way of a reaction, such as a crosslinking reaction, with the one or more polymers. In some embodiments, crosslinking the one of more polymers renders the formed crosslinked polymer insoluble and thus results in the consolidation of the crosslinked one or more polymers (the crosslinked polymer).

Examples of suitable cross-linkable polymers include any suitable polymer that is capable of consolidating upon being crosslinked. Such cross-linkable polymers may include synthetic and/or naturally occurring polymers or polyelectrolytes capable of dispersing in an aqueous or organic solvent solution (such as those mentioned above and throughout the present specification) that can undergo a crosslinking reaction with the introduction of a crosslinking agent. Suitable polymers may also include polysaccharides such as substituted galactomannans, such as guar gums, high-molecular weight polysaccharides composed of mannose and galactose sugars, or guar derivatives such as hydroxypropyl guar (HPG), carboxymethylhydroxypropyl guar (CMHPG) and carboxymethyl guar (CMG), hydrophobically modified guars, guar-containing compounds, and synthetic polymers. Further details regarding potential suitable polyelectrolyte complexes and surfactant-polymer complexes may be found in the following reference, Linear Viscoelasticity of Polyelectrolyte Complex Coacervates, Evan Spruijt, Martien A. Cohen Stuart, and Jasper van der Gucht, Macromolecules 2013, 46 (4), 1633-1641, the disclosure of which is hereby incorporated by reference in its entirety.

Other suitable classes of water-soluble polymers that may be suitable for the methods of the present disclosure include polyvinyl polymers, polymethacrylamides, cellulose ethers, lignosulfonates, and their ammonium, alkali metal, and alkaline earth salts thereof. Further examples of other suitable water soluble polymers include acrylic acid-acrylamide copolymers, acrylic acid-methacrylamide copolymers, polyacrylamides, partially hydrolyzed polyacrylamides, partially hydrolyzed polymethacrylamides, polyvinyl alcohol, polyalkyleneoxides, other galactomannans, heteropolysaccharides obtained by the fermentation of starch-derived sugar and their ammonium and alkali metal salts thereof. Suitable examples of biopolymers include gellan, κ-carrageenan, sodium alginate, gelatin, agar, agarose, maltodextrin, chitosan, and combinations thereof. Additional examples of biopolymers are described in U.S. Pat. Nos. 5,726,138 and 7,169,427, and U.S. Patent Application Pub. No. 2005/0042192, the disclosure of each of which is incorporated by reference herein in its entirety.

Cellulose derivatives such as hydroxyethylcellulose (HEC) or hydroxypropylcellulose (HPC), carboxymethylhydroxyethylcellulose (CMHEC) and carboxymethylcellulose (CMC), with or without crosslinkers, may also be used as water-soluble polymers.

In embodiments, the treatment fluid may comprise one or more polymer chemical entities and a cross-linking agent. The phrase "cross-linking agent" refers, for example, to a compound or mixture that assists in the formation of a three-dimensional polymerized structure of the one or more polymers (which may be insoluble) under at least some downhole conditions, such as after exposure to a consolidation event, such as, for example, a change in pH. Any crosslinker may be used, for example, organic crosslinkers, inorganic crosslinkers, divalent metals, trivalent metals, and polyvalent metals, such as calcium, iron, chromium, copper, boron, titanium, zirconium, aluminum and the like. Suitable boron crosslinked polymers systems include guar and substituted guars crosslinked with boric acid, sodium tetraborate, and encapsulated borates; borate crosslinkers may be used with buffers and pH control agents such as sodium hydroxide, magnesium oxide, sodium sesquicarbonate, and sodium carbonate, amines (such as hydroxyalkyl amines, anilines, pyridines, pyrimidines, quinolines, and pyrrolidines, and carboxylates such as acetates and oxalates) and with delay agents such as sorbitol, aldehydes, and sodium gluconate. Suitable zirconium crosslinked polymer systems include those crosslinked by zirconium lactates (for example sodium zirconium lactate), triethanolamines, 2,2'-iminodiethanol, and with mixtures of these ligands, including when adjusted with bicarbonate. Suitable titanates include lactates and triethanolamines, and mixtures, for example delayed with hydroxyacetic acid.

The concentration of the crosslinker in the treatment fluid may be from about 0.001 wt. % to about 10 wt. %, such as about 0.005 wt. % to about 2 wt. %, or about 0.01 wt. % to about 1 wt. %.

In some embodiments, a pH change may trigger cross-linking and the consolidation of one or more of the polymer chemical entities. Adjusting the pH to a predetermined pH that results in the crosslinking and consolidation of the one or more polymers while shearing the treatment fluid (with an effective shear rate) forms the polymeric structures in situ. In some embodiments, the treatment fluid in which the cross-linking event is triggered may have any suitable viscosity, such as a viscosity of from about 1 cP to about 1,000 cP (or from about 10 cP to about 100 cP) at the treating temperature, which may range from a surface temperature to a bottom-hole static (reservoir) temperature, such as from about −40° C. to about 150° C., or from about 10° C. to about 120° C., or from about 25° C. to about 100° C., and any effective shear rate may be used during the application of a shear event; in some embodiments, the shear rate that is observed during the application of a shear event to the above-mentioned fluid(s) may be in a range of from about 1 $s^{-1}$ to about 100,000 $s^{-1}$, such as a shear rate in a range of from about 100 $s^{-1}$ to about 10,000 $s^{-1}$, or a shear rate in a range of from about 500 $s^{-1}$ to about 5,000 $s^{-1}$ as measured by common methods. The magnitude of the effective shear rate that may be used to form polymeric structures will depend on the composition of the treatment fluid.

Such polymeric structures may form in the fluid anywhere within, or inside of the surface mixing equipment, such as a POD blender, or between the surface mixing equipment and the downhole formation to be treated. In some embodiments, the shear rate applied to this polymer solution may be adjusted as desired to form a predetermined size of polymeric structures in the treatment fluid.

Consolidation Event: Polyelectrolyte Complexes and Surfactant-Polymer Complexes

In some embodiments, the treatment fluid may comprise one or more polymers, such as polyelectrolyte polymers, dissolved in a solvent. The interaction of two oppositely charged polyelectrolyte polymers can trigger the consolidation of one or more of the polymers by way of the formation of a polyelectrolyte complex (PEC). In some embodiments, the formation of the polyelectrolyte complex comprising the one or more polymers may render the formed polymeric structure insoluble. Examples of the polyelectrolyte polymers may include the one or more polymers described herein. Specific examples of these polymers are described in U.S. Patent Application Pub. Nos. 2013/0056213 and 2013/0048283, the disclosures of which are incorporated by reference herein in their entirety.

The consolidation event may be initiated or triggered by either placing a component and/or second solution containing an oppositely charged polyelectrolyte polymer, such as a surfactant, that triggers the consolidation of one or more of the polymers by way of a reaction, such as an ionic bonding or ionic charge association. In some embodiments, the formation of the polyelectrolyte complex comprising the one or more polymers and the surfactant renders the formed polymer complex insoluble and thus results in the consolidation of the polyelectrolyte complex. The surfactant can exist as either an individual molecular entity or as part of an incorporated micelle structure.

The polyelectrolyte polymers may be dissolved in a solvent containing one or more water soluble salts (in addition to the salts described above, examples include potassium chloride, sodium chloride, ammonium chloride, sodium sulfate, and the like) along with an oppositely charged polyelectrolyte polymer or surfactant. In such embodiments, the consolidation of the one or more polymers may be inhibited by the presence of the dissolved salt at certain elevated concentrations, such as, for example, from about 2 wt. % to about 6 wt. %, from about 2 wt. % to about 5 wt. %, about 3 wt. % to about 5 wt. % and about 4 wt. % to about 4.5 wt. %. In these embodiments, the consolidation may be initiated by contacting the treatment fluid with a low salinity solution (such as fresh water or water having a salt concentration less than 2 wt. %, such as for example, from about 0.5 wt. % to about 1.5 wt. %) that allows for the diffusion of salt ions out of the treatment fluid and thus reducing the salt concentration of the treatment fluid to a point where the charge association between the dissolved polyelectrolyte(s) and/or surfactants is no longer inhibited. This allows for the formation of the polyelectrolyte complex and subsequent consolidation event to occur.

Consolidation Event: Solvent Salinity Change Consolidation

In embodiments, a solvent salinity change consolidation event may be used in the method for treating a subterranean formation of the present disclosure. Such methods may include contacting a treatment fluid comprising a solution of one or more polymers with an additional treatment fluid that results in a change in the salinity or ionic concentration (of the treatment fluid comprising the one or more polymers) that triggers the consolidation of one or more of the polymers of the treatment fluid while shearing the polymer solution, thereby forming polymeric structures. These actions may occur at any time during the methods of the present disclosure for treating subterranean formation. For example, these actions may occur anywhere at the well site, such as, for example, while the treatment fluid is at the surface, such as in the surface mixing equipment, or while the treatment fluid is in the downhole formation.

In some embodiments, the treatment fluid in which the above-mentioned action occurs may have any suitable viscosity, such as a viscosity of from about 1 cP to about 1,000 cP (or from about 10 cP to about 100 cP) at the treating temperature, which may range from a surface temperature to a bottom-hole static (reservoir) temperature, such as from about −40° C. to about 150° C., or from about 10° C. to about 120° C., or from about 25° C. to about 100° C., and any effective shear rate may be used during the application of a shear event; in some embodiments, the shear rate that is observed during the application of a shear event to the above-mentioned fluid(s) may be in a range of from about 1 $s^{-1}$ to about 100000 $s^{-1}$, such as a shear rate in a range of from about 100 $s^{-1}$ to about 10000 $s^{-1}$, or a shear rate in a range of from about 500 $s^{-1}$ to about 5000 $s^{-1}$ as measured by common methods. The magnitude of the effective shear rate will depend on the composition of the treatment fluid.

There are two opposite scenarios where a change in salinity can prompt a consolidation event. The first is the use of one or more polymers are soluble in low saline solvents that consolidate with an increase in salinity. In the other, one or more polymers soluble in high salinity water/solvent can be made insoluble by mixing with fresh water/solvent.

The treatment fluid comprising the polymer solution may be a drilling fluid, a fracturing fluid, cement slurry, completion fluid, salt brine, and produced or fresh water. The consolidating medium (or second treatment fluid) may be a pure solvent or a mixture, and may have higher or lower ionic concentration than the polymer solution of the treatment fluid. The polymer solution may be composed of a single polymer, or the polymer solution may include a mixture of two or more polymers, where at least one of them is insoluble in the consolidating medium (or second treatment fluid) with different ionic concentration.

In some embodiments, the total amount of the polymer in solution in the treatment fluid may be in the range of from about 0.1 to about 10% by weight of the treatment fluid, such as in the range of from about 0.2 to about 5% by weight of the treatment fluid, or in the range of from about 0.5 to about 1.5% by weight of the treatment fluid. Polymers suitable for ionic change consolidation (solvent salinity change consolidation) may be synthetic or naturally-occurring.

Polyvinyl alcohol (PVA) is an example of a polymer which can be dissolved initially in fresh water (or low salinity), but will consolidate out of solution when mixed with a high salinity fluid. The opposite is true using poly (2-hydroxyethylmethacrylate) (polyHEMA), which is soluble in water with high salt levels, such as zinc bromide/ calcium bromide brines, but otherwise insoluble in water with low salt levels. If either case is triggered to consolidate while being exposed to a shear event in which an effecting shear rate is being applied to the treatment fluid, a polymeric structured may be produced for further utilization within the treatment process or well lifecycle.

Consolidation Event: Temperature Change Consolidation

In embodiments, a temperature change consolidation event may be used in the method for treating a subterranean formation of the present disclosure. Such methods may include increasing the temperature of a treatment fluid containing one or more polymers in solution to trigger the consolidation of one or more of the polymers while shearing the treatment fluid, thereby forming polymeric structures in the treatment fluid anywhere between the surface mixing equipment and the downhole formation.

In some embodiments, the treatment fluid in which a temperature change is used to trigger the consolidation may have any suitable viscosity, such as a viscosity of from about 1 cP to about 1,000 cP (or from about 10 cP to about 100 cP) at the treating temperature, which may range from a surface temperature to a bottom-hole static (reservoir) temperature, such as from about −40° C. to about 150° C., or from about 10° C. to about 120° C., or from about 25° C. to about 100° C., and any effective shear rate may be used during the application of a shear event; in some embodiments, the shear rate that is observed during the application of a shear event to the above-mentioned fluid(s) may be in a range of from about 1 $s^{-1}$ to about 100000 $s^{-1}$, such as a shear rate in a range of from about 100 $s^{-1}$ to about 10000 $s^{-1}$, or a shear rate in a range of from about 500 $s^{-1}$ to about 5000 $s^{-1}$ as measured by common methods. The magnitude of the effective shear rate that may be used to form polymeric structures will depend on the composition of the treatment fluid.

The treatment fluid comprising the polymer solution may be a drilling fluid, a fracturing fluid, cement slurry, or a completion fluid. The temperature may be increased by any suitable means, such as by heating the treatment fluid comprising polymer solution, and/or by mixing the treatment fluid comprising the polymer solution with another treatment fluid, which is at a higher temperature. The polymer solution of the treatment fluid may be composed of a single polymer, or a mixture of two or more polymers, where at least one of the one or more polymers of the one or more polymers is lower critical solution temperature (LCST) polymer, so it becomes insoluble after increasing the temperature above a determined value.

As used herein, the term "LCST polymer" refers to a polymer that exhibits a lower critical solution temperature. LCST polymers are soluble at temperatures below the LCST, but form a cloudy mixture at the LCST (also referred as the cloud point). A further temperature increase leads to complete consolidation of the polymer. In some embodiments, the consolidation may be caused by an increase in the hydrophobicity of the polymer as the temperature increases above the LCST.

In some embodiments, the total amount of the polymer in solution in the treatment fluid may be in the range of from about 0.1 to about 20% by weight of the treatment fluid, such as in the range of from about 0.2 to about 10% by weight of the treatment fluid, or in the range of from about 0.5 to about 5% by weight of polymer solution. Some examples of LCST polymers include poly(N-isopropylacrylamide), poly (methyl vinyl ether), hydroxypropyl cellulose, poly(ethylene glycol), poly(vinyl caprolactam), and their copolymers.

Proppant Transport

As discussed above, in some embodiments, the methods and treatment fluids of the present disclosure may comprise one or more polymers and a slurry of proppant. Proppant particles carried by the treatment fluid remain in the fracture created, thus propping open the fracture when the fracturing pressure is released and the well is put into production.

Polymeric structures may be formed in situ, optionally in the presence of the proppant, when the one or more polymers is exposed to a consolidation event, such as one or more of those mentioned above, to generate polymeric structures via a combination of chemical or physical reactions in the presence of a shear event, such as a flow-induced shear, for example, in either the surface mixing, the transport line, and/or in the wellbore. In some embodiments, the treatment fluid comprising the proppant may have any suitable viscosity, such as a viscosity of from about 1 cP to about 1,000 cP (or from about 10 cP to about 100 cP) at the treating temperature, which may range from a surface temperature to a bottom-hole static (reservoir) temperature, such as from about −40° C. to about 150° C., or from about 10° C. to about 120° C., or from about 25° C. to about 100° C., and any effective shear rate may be used during the application of a shear event; in some embodiments, the shear rate that is observed during the application of a shear event to the above-mentioned fluid may be in a range of from about 1 s$^{-1}$ to about 100000 s$^{-1}$, such as a shear rate in a range of from about 100 s$^{-1}$ to about 10000 s$^{-1}$, or a shear rate in a range of from about 500 s$^{-1}$ to about 5000 s$^{-1}$ as measured by common methods. The magnitude of the effective shear rate that may be used to form polymeric structures will depend on the composition of the treatment fluid.

In some embodiments, the polymeric structures that are generated, optionally in the presence of the proppant, may be a solid material, gel material, or a combination thereof.

The polymeric structures (also referred to herein as a "fiber-like precipitate", unless otherwise specified) formed by the methods of the present disclosure may be used in a variety of well treatment applications, such as hydraulic fracturing to place proppant in the fracture. Likewise, the polymeric structures formed by the methods of the present disclosure may be used in a non-damaging treatment fluid, such as a drilling fluid, cement slurry, or a completion fluid. In embodiments, the consolidation event (of the one or more polymers) that occurs in such fluids may be based on adjusting the solubility of the one or more polymers by way of altering the saline concentration, ionic strength and/or surfactant concentration of the treatment fluid.

In some embodiments, adjusting (increasing) the salinity of a low salinity treatment fluid, such as a treatment fluid comprising fresh water or about 0.5% or less (by weight) of a salt (such as KCl, K$_2$SO$_4$, or NaSO$_4$) and dissolved polymer, such as polyvinyl alcohol (PVOH), at a predetermined temperature (and location) in the wellbore provides a polymer structure that may be elongated by applying a predetermined shear rate. In some embodiments, after the elongated polymer consolidates have performed their solid-form function, the elongated polymer consolidates generated by the methods of the present disclosure may be readily removed from the subterranean formation, such as a proppant pack in a subterranean formation, because they can be re-dissolved (at normal formation temperatures) when the treatment fluid is re-adjusted to be a low salinity aqueous fluid again. Thus, the treatment fluids and methods of the present disclosure may be used, for example, in gravel packing applications to create tighter, cleaner packs versus traditional gravel packs.

In some embodiments, adjusting (decreasing) the salinity of a low salinity treatment fluid at a predetermined temperature in the wellbore provides a polymeric structure that may be elongated by applying a predetermined shear rate. The description hereafter refers to one or more polymers, such as poly(2-hydroxyethylmethacrylate) (polyHEMA), as one example of a polymer and its incorporation into a non-damaging treatment fluid, such as a drilling fluid, a fracturing fluid, cement slurry, or a completion fluid, and how adjusting the solubility of this one or more polymers may occur by way of saline concentration, ionic strength and/or surfactants. Those skilled in the art will appreciate that other polymers (besides polyHEMA) may be used in the treatment fluids and methods of the present disclosure and are equally applicable to dissolvable polymers that meet the above-stated condition of having similarly alterable solubility modes in the context of well treatment fluids and methodology.

The treatment fluids and methods of the present disclosure may use polyHEMA in a soluble form while pumping the treatment fluid downhole and then generate solid fiber-like materials by adjusting the treatment fluid conditions to form a polyHEMA polymeric structure while applying a predetermined shear rate (after the soluble polyHEMA has been transported downhole). By changing the salinity and/or temperature conditions of the treatment fluid, the polyHEMA consolidates, the polyHEMA that consolidates may be acted on by a shear event to elongate the polyHEMA consolidate and form elongated polyHEMA polymeric structures in the treatment fluid. The generated elongated polyHEMA polymeric structures may then be used in, for example, fiber assisted transport.

In other embodiments, adjusting (decreasing) the salinity of a high salinity treatment fluid, such as a treatment fluid comprising a large amount (by weight; such as a saturated salt solution or a solution that contains an amount of salt that is at least about 80%, such as at least about 90% of a weight of a salt that would be used to make a saturated salt solution) of a salt (such as KCl, K$_2$SO$_4$, or NaSO$_4$) and dissolved polyHEMA, at a predetermined temperature (and location) in the wellbore provides a polyHEMA polymeric structure that may be elongated by applying a predetermined shear rate. In some embodiments, after the elongated polyHEMA polymeric structures have performed their solid-form function, the polymeric structured polyHEMA fibers generated by the methods of the present disclosure may be readily removed from the subterranean formation, such as a proppant pack in a subterranean formation, because they can be re-dissolved (at normal formation temperatures) when the treatment fluid is re-adjusted to be a low salinity or aqueous fluid again. Thus, the treatment fluids and methods of the present disclosure may be used, for example, in gravel packing applications to create tighter, cleaner packs versus traditional gravel packs.

In embodiments, the polyHEMA may have a weight average molecular weight greater than about 5000 Daltons up to about 500,000 Daltons or more, or from about 10,000 Daltons to about 200,000 Daltons.

The solubility of the polyHEMA in the treatment fluid may be influenced by the molecular weight, particle size, and the like.

A system comprising a treatment fluid and polyHEMA (and any other additives) may be batch-mixed or mixed on-the-fly using otherwise conventional treatment fluid mixing equipment and mixing techniques.

If the polymeric structures (also referred to herein as a "fiber-like precipitate", unless otherwise specified) formed by the methods of the present disclosure are to be used as a fluid loss additive, the size of the elongated polyHEMA polymeric structures may be selected based on the desired fluid loss properties (for example, spurt and wall building coefficient).

By using a treatment fluid to provide a low salt environment, the elongated polyHEMA polymeric structure may be used to control fluid loss, such as by forming a filter cake. Salt concentration in the treatment fluid containing the dissolved polyHEMA may be about 8 percent by weight or greater, or about 10 percent by weight or greater, or at least about 12 percent by weight or greater. The choice of salt may include any salt that inhibits the polyHEMA from consolidating and is otherwise suitable for use in a well treatment fluid. After the consolidation event occurs (such a salt concentration may be less than about 5 weight percent, or about 2 percent by weight or less, or the treatment fluid may be replaced with fresh water), the elongated polyHEMA polymeric structure may be present in the treatment fluid at a concentration or loading of from about 0.6 to about 24 g/L (from about 5 to about 200 ppt), from about 1.2 to about 18 g/L (from about 10 to about 150 ppt), or from about 2.4 to about 9.6 g/L (from about 20 to about 80 ppt).

In embodiments, the contacting a filter cake comprising the polymeric structure in a production zone with a solution may restore permeability of the downhole surface in the subterranean formation. For example, after the solid-state function of the elongated polyHEMA polymeric structure has been performed, the salt concentration of the treatment fluid may be increased (for example, to a salt concentration at which the elongated polyHEMA polymeric structure is soluble) to dissolve the elongated polyHEMA polymeric structure and restore permeability of the downhole surface in the subterranean formation and/or clean up the surface of the formation or the filter cake. In embodiments, such a salt concentration may be any desired salt concentration that makes the polymeric structure soluble again, such as a salt concentration of about 8 percent by weight or greater, or about 10 percent by weight or greater, or at least about 12 percent by weight or greater.

In the methods of the present disclosure, the polymeric structure, such as an elongated polyHEMA polymeric structure, may be used as a fluid loss control agent in an otherwise conventional drilling fluid or fluid loss control pill, for example. As noted above, the solubility of the polymeric structure, such as an elongated polyHEMA polymeric structure, in aqueous solution may be a function of a number of variables. Controlling these parameters enables the use of the polymeric structure of the present disclosure, such as an elongated polyHEMA polymeric structure, as a fluid loss control agent and/or as a temporary formation seal.

The polymeric structure of the present disclosure, such as an elongated polyHEMA polymeric structure, may be used as a delayed viscosity breaker in crosslinked polymer and viscoelastic fluid systems ("VES"). Upon dissolution, the polymeric structure of the present disclosure, such as an elongated polyHEMA polymeric structure, can function as a viscosity breaker. The break can thus be timed to occur by delaying dissolution of the polymeric structure of the present disclosure, such as an elongated polyHEMA polymeric structure.

In hydraulic fracturing, frac-packing, and gravel packing embodiments, a VES or crosslinked polymer may be added in the pad, throughout the treatment or to preselected proppant or gravel stages. The polymeric structure of the present disclosure, such as an elongated polyHEMA polymeric structure, may be a polymeric structure in any of these uses and will retard flowback and settling of proppant or gravel, and/or of fines if they are present, until the polymeric structure of the present disclosure, such as an elongated polyHEMA polymeric structure, dissolves. A self-destructing fluid loss additive and filter cake is particularly useful in hydraulic fracturing, frac-packing, and gravel packing because mechanical removal methods are impossible and methods involving contacting the fluid loss additive and filter cake with an additional fluid to react with the filter cake and/or fluid loss additive are not practical.

The treatment fluids in which polymeric structure of the present disclosure, such as an elongated polyHEMA polymeric structure, are formed and the methods of the present disclosure in which polymeric structure of the present disclosure, such as an elongated polyHEMA polymeric structure, are formed may be used in any of these cases (gravel packing, fracturing followed by gravel packing, and fracturing for short wide fractures).

The concentration of the polymeric structure of the present disclosure, such as an elongated polyHEMA polymeric structure, may range from about 0.6 g/L (about 5 ppt) to about 9.6 g/L (about 80 ppt), or from about 2.4 g/L (about 20 ppt) to about 7.2 g/L (about 60 ppt).

In gravel packing, or combined fracturing and gravel packing, the treatments may be done with or without a screen. Although the aforementioned methods of the present disclosure are described in terms of unfoamed fluids, fluids foamed or energized (for example with nitrogen or carbon dioxide or mixtures of those gases) may be used. Adjustment of the appropriate concentrations due to any changes in the fluid properties or proppant concentration consequent to foaming may be made.

Any proppant (gravel) may be used, provided that it is compatible with the polymeric structure of the present disclosure, such as an elongated polyHEMA polymeric structure, the formation, the fluid, and the desired results of the treatment. Such proppants (gravels) may be natural or synthetic (including but not limited to glass beads, ceramic beads, sand, and bauxite), coated, or contain chemicals; more than one may be used sequentially or in mixtures of different sizes or different materials. The proppant may be resin coated, provided that the resin and any other chemicals in the coating are compatible with the other chemicals of the present disclosure, particularly the components of the viscoelastic surfactant fluid system. Proppants and gravels in the same or different wells or treatments may be the same material and/or the same size as one another and the term "proppant" is intended to include gravel in this discussion. In general the proppant used will have an average particle size of from about 0.15 mm to about 2.39 mm (about 8 to about 100 U.S. mesh), or of from about 0.25 to about 0.43 mm (40/60 mesh), or of from about 0.43 to about 0.84 mm (20/40 mesh), or of from about 0.84 to about 1.19 mm (16/20), or of from about 0.84 to about 1.68 mm (12/20 mesh) and or of from about 0.84 to about 2.39 mm (8/20 mesh) sized materials. Normally the proppant will be present in the slurry in a concentration of from about 0.12 to about 3 kg/L, or about 0.12 to about 1.44 kg/L (about 1 PPA to about 25 PPA, or from about 1 to about 12 PPA; PPA is "pounds proppant added" per gallon of liquid).

Optionally, the fracturing fluid may contain materials designed to limit proppant flowback after the fracturing operation is complete by forming a porous pack in the fracture zone. Such materials are described in U.S. Pat. No. 5,501,275, the disclosure of which is hereby incorporated by reference in its entirety. Suitable proppant flowback inhibitors include fibers or platelets of novoloid or novolbid-type polymers, as described in U.S. Pat. No. 5,782,300, the disclosure of which is herein incorporated by reference in its entirety.

Suitable polymeric structures of the present disclosure, such as an elongated polyHEMA polymeric structure, may assist in transporting, suspending and placing proppant in hydraulic fracturing and gravel packing, for example, and may then be dissolved to minimize or eliminate the presence of fibers in the proppant pack without releasing degradation products that hinder fluid flow, or prematurely decreasing the ability of otherwise suitable metal-crosslinked polymers or VES systems to viscosify the carrier fluid. As used herein, a system in which suitable polymeric structures of the present disclosure, such as an elongated polyHEMA polymeric structure, are used to slurry and transport proppant is referred to as "fiber-assisted transport." Where the system also includes a fluid viscosified with a suitable metal-crosslinked polymer or VES system, it will be referred to as a "fiber/polymer or viscoelastic surfactant viscosifier" system or an "FPV" system. Such systems have been described in U.S. Pat. No. 7,275,596, which is hereby incorporated by reference in its entirety.

The FPV system is described herein primarily in terms of hydraulic fracturing, but it is also suitable for gravel packing, or for fracturing and gravel packing in one operation (called, for example frac and pack, frac-n-pack, frac-pack, Stimpac treatments, or other names), which are also used extensively to stimulate the production of hydrocarbons, water and other fluids from subterranean formations. These operations involve pumping a slurry of proppant (natural or synthetic materials that prop open a fracture after it is created) in hydraulic fracturing, or gravel in gravel packing. In low permeability formations, the goal of hydraulic fracturing is generally to form long, high surface area fractures that greatly increase the magnitude of the pathway of fluid flow from the formation to the wellbore. In high permeability formations, the goal of a hydraulic fracturing treatment may be to create a short, wide, highly conductive fracture, in order to bypass near-wellbore damage done in drilling and/or completion, to ensure good fluid communication between the rock and the wellbore and also to increase the surface area available for fluids to flow into the wellbore.

The FPV system is particularly suitable for fracturing tight gas wells, which may be low-permeability environments with extended fracture closure times; in such cases the fracture may remain open for hours after injection ceases, and the carrier fluid may break and no longer suspend the proppant. The FPV system allows lower polymer or VES loadings, reduced fracture height growth (because of the lower viscosity that can be used), reduced proppant settling, and increased retained permeability (improved dimensionless fracture conductivity), each of which result in improved production rates. The FPV system is also particularly suitable for gravel packing when dense brines are used that contain high concentrations of calcium or other ions that would polymeric structure with the degradation products of some degradable fibers (for example up to 12,000 ppm calcium). The salinity in such systems may help delay polymeric structure of the present disclosure, such as an elongated polyHEMA polymeric structure, dissolution since the polyHEMA is insoluble at high salinity conditions.

In some embodiments, the polymeric structure of the present disclosure, such as an elongated polyHEMA polymeric structure, and any other fiber are mixed with a slurry of proppant in crosslinked polymer fluid in the same way and with the same equipment as is used for fibers used for sand control and for prevention of proppant flowback, for example, by the method described in U.S. Pat. No. 5,667,012, which is hereby incorporated by reference in its entirety. In fracturing, for proppant transport, suspension, and placement, the fibers are normally used with proppant or gravel laden fluids, not normally with pads, flushes or the like.

While the treatment fluids of the present disclosure are described herein as comprising the above-mentioned components, it should be understood that the treatment fluids of the present disclosure may optionally comprise other chemically different materials. In embodiments, the treatment fluid may further comprise stabilizing agents, surfactants, diverting agents, or other additives. Additionally, a treatment fluid may comprise a mixture of various crosslinking agents, and/or other additives, such as fibers or fillers, provided that the other components chosen for the mixture are compatible with the intended use of the treatment fluid. Furthermore, the treatment fluid may comprise buffers, pH control agents, and various other additives added to promote the stability or the functionality of the treatment fluid. The treatment fluid may be based on an aqueous or non-aqueous solution. The components of the treatment fluid may be selected such that they may or may not react with the subterranean formation that is to be treated.

In this regard, the treatment fluid may include components independently selected from any solids, liquids, gases, and combinations thereof, such as slurries, gas-saturated or non-gas-saturated liquids, mixtures of two or more miscible or immiscible liquids, and the like, as long as such additional components allow for the consolidation of the one or more polymers and/or reaction product thereof upon exposure to the consolidation triggering event. For example, the treatment fluid may comprise organic chemicals, inorganic chemicals, and any combinations thereof. Organic chemicals may be monomeric, oligomeric, polymeric, crosslinked, and combinations, while polymers may be thermoplastic, thermosetting, moisture setting, elastomeric, and the like. Inorganic chemicals may be metals, alkaline and alkaline earth chemicals, minerals, and the like.

Various other fibrous materials may also be included in the treatment fluid. Suitable fibrous materials may be woven or nonwoven, and may be comprised of organic fibers, inorganic fibers, mixtures thereof and combinations thereof. Such fibers may act as seeds for the consolidation of the in situ formed polymeric structures. For example, the polymeric structures that form in the treatment fluids of the present disclosure may form on and/or around seed particles (including, for example, proppants) and/or fibers after exposure to the consolidation triggering event. In some embodiments, the polymeric structures of the present disclosure may be otherwise supported by the seed fibers in such a way that the formed polymeric structure does not easily come loose from the fibers.

Stabilizing agents can be added to slow the degradation of the polymeric structure after its formation downhole. Typical stabilizing agents may include buffering agents, such as agents capable of buffering at pH of about 8.0 or greater (such as water-soluble bicarbonate salts, carbonate salts, phosphate salts, or mixtures thereof, among others); and chelating agents (such as ethylenediaminetetraacetic acid (EDTA), nitrilotriacetic acid (NTA), or diethylenetriaminepentaacetic acid (DTPA), hydroxyethylethylenediaminetriacetic acid (HEDTA), or hydroxyethyliminodiacetic acid (HEIDA), among others). Buffering agents may be added to the treatment fluid in an amount of at least about 0.05 wt. %, such as from about 0.05 wt. % to about 10 wt. %, and from about 0.1 wt. % to about 2 wt. %, based upon the total weight of the treatment fluid. Chelating agents may be added to the treatment fluid in an amount of at least about 0.75 mole per mole of metal ions expected to be encountered in the downhole environment, such as at least about 0.9 mole per mole of metal ions, based upon the total weight of the treatment fluid.

In some cases, after the consolidated polymeric structures have performed their solid-form function, the conditions may be altered to re-solubilize the consolidated polymeric structures. The conditions may include a thermal degradation, introduction of a breaker (such as an enzyme or oxidizer), introduction of a chelating agent, a change to the solvent salinity, pH, or hydrophobicity, or any other method allowing the polymeric structures to degrade or re-solubilize.

In embodiments, the treatment fluid may be driven into a wellbore by a pumping system that pumps one or more treatment fluids into the wellbore. The pumping systems may include mixing or combining devices, wherein various components, such as fluids, solids, and/or gases maybe mixed or combined prior to being pumped into the wellbore.

The mixing or combining device may be controlled in a number of ways, including, but not limited to, using data obtained either downhole from the wellbore, surface data, or some combination thereof.

The foregoing is further illustrated by reference to the following examples, which are presented for purposes of illustration and are not intended to limit the scope of the present disclosure.

EXAMPLES

Example 1

Solvent Change

Figure 6A:
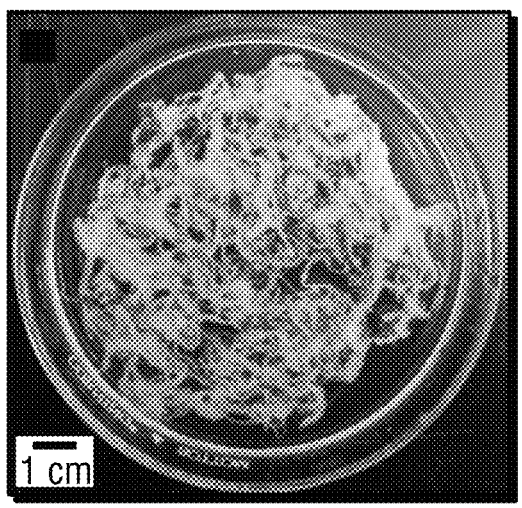
FIG. 6A is an image of the polymeric structures obtained from consolidation of guar with isopropanol.
Figure 6B:
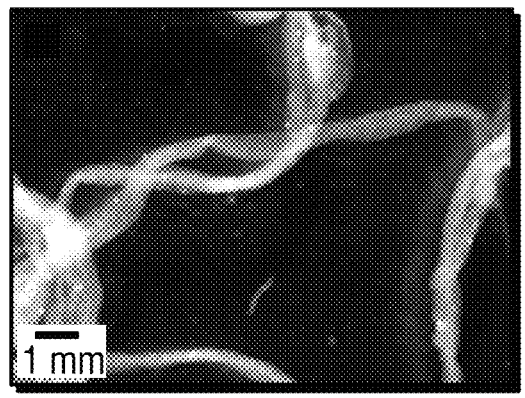
FIG. 6B is a stereo microscope image of these polymeric structures.

A solution of guar gum (0.36 wt. %) was prepared by hydrating the polymer in distilled water while stirring the mixture for 30 minutes at approximately 1500 rpm in a blender. Next, the guar solution was transferred to a plastic beaker. While stirring at 1000 rpm using an overhead mixer, isopropanol was added via syringe to reach a final concentration of 28% isopropanol. The mixture was stirred for two minutes at 1000 rpm (submitting the fluid to shear rates between 150 to 300 $s^{-1}$) following the addition of isopropanol. Guar precipitated forming white polymeric structures, as illustrated in FIG. 6A, which is an image of the polymeric structures obtained from consolidation of guar with isopropanol, and FIG. 6B, which is a stereo microscope image of the polymeric structures.

Example 2

Solvent Change

Figure 7A:
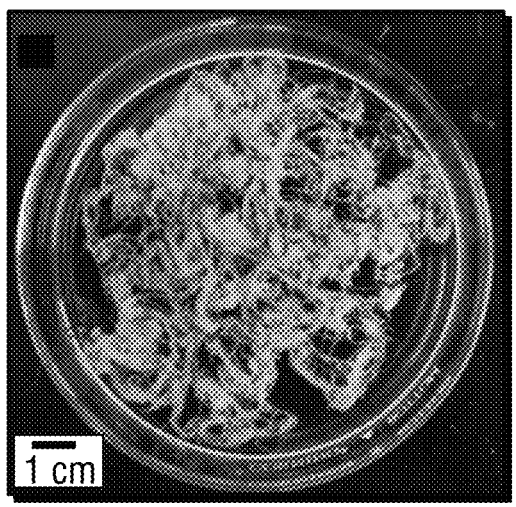
FIG. 7A is an image of the polymeric structures obtained from consolidation of guar with methanol in presence of 4% KCl.
Figure 7B:
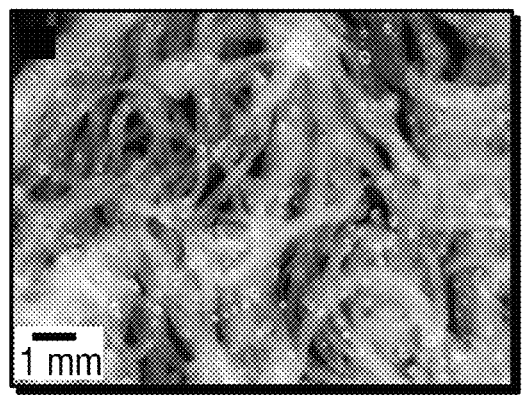
FIGS. 7B and 7C are stereo microscope images of these polymeric structures.
Figure 7C:
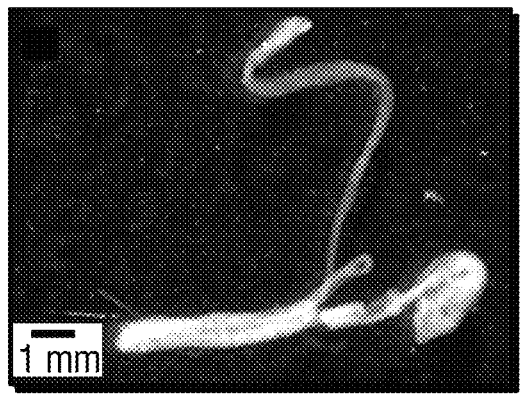

A solution of guar gum (0.54 wt. %) was prepared by hydrating the polymer in distilled water while stirring the mixture 30 minutes at approximately 1500 rpm in a blender. Then potassium chloride was added to obtain a concentration of 4% KCl in the guar solution. Mixture was stirred for 15 minutes in a blender. Next, the guar solution was transferred to a plastic beaker. While stirring at 1000 rpm using an overhead mixer, methanol was added via syringe to reach a final concentration of 28% methanol. The mixture was stirred for two minutes at 1000 rpm (submitting the fluid to shear rates between 150 to 300 $s^{-1}$) following the addition of methanol. Guar precipitated forming white polymeric structures as illustrated in FIG. 7A (an image of the polymeric structures obtained from consolidation of guar with methanol in presence of 4% KCl), FIGS. 7B and 7C (stereo microscope images of the polymeric structures). Although most of the strands are entangled (see FIGS. 7A and 7B), isolated polymeric structures were also observed (see FIG. 7C).

Example 3

Solvent Change

Figure 8A:
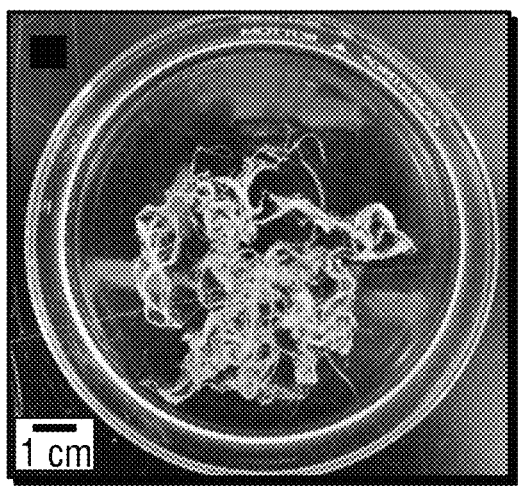
FIG. 8A is an image of the polymeric structures obtained adding alginate solution to ethylene glycol butyl ether.
Figure 8B:
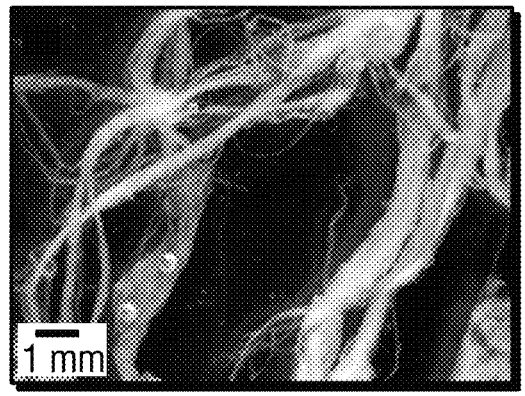
FIG. 8B is a stereo microscope image of these polymeric structures.

A sodium alginate solution (1.5 wt. %) (Sigma Aldrich, alginic acid sodium salt from brown seaweeds) was prepared by adding the polymer powder to distilled water and stirring the mixture 30 minutes at approximately 1500 rpm in a blender. Separately, 50 mL of ethylene glycol butyl ether (Sigma Aldrich) were added to a plastic beaker. While stirring the ethylene glycol butyl ether at 1000 rpm using an overhead mixer, 10 mL of the alginate solution were added via syringe. The mixture was stirred 2 minutes at 1000 rpm following the addition of alginate. The alginate precipitated forming long, white polymeric structures, as illustrated in FIG. 8A, which is an image of the polymeric structures obtained adding alginate solution to ethylene glycol butyl ether, and FIG. 8B, which is a stereo microscope image of the polymeric structures.

Example 4

Solvent Change

Figure 9A:
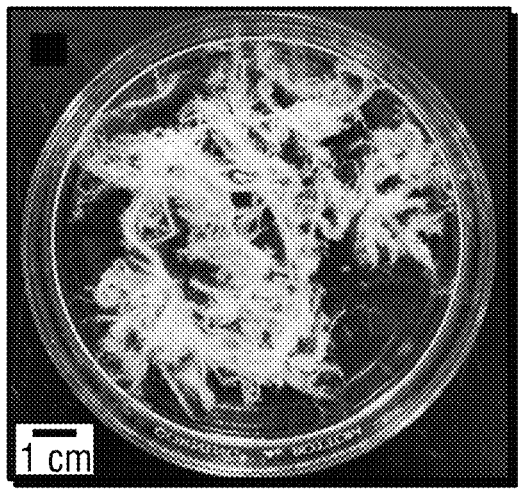
FIG. 9A is an image of PLA polymeric structures obtained from consolidation in water.
Figure 9B:
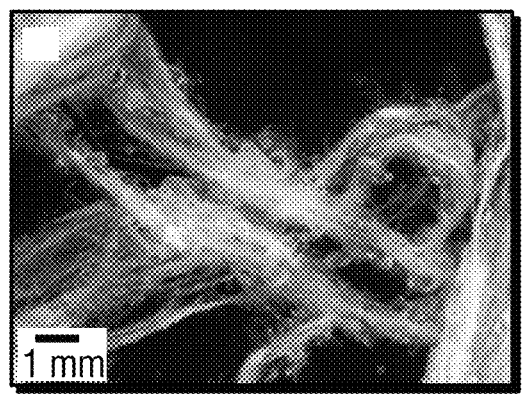
FIG. 9B is a stereo microscope image of these polymeric structures.

A glass beaker equipped with magnetic stir bar was charged with 2.0 grams of polylactic acid (PLA, Sigma Aldrich). The polymer was hydrated in 100 mL of diethylene glycol dimethyl ether (Sigma Aldrich) by stirring the mixture 1 hour in a stir plate. Separately, 50 mL of distilled water were added to a plastic beaker. While stirring the water at 1250 rpm using an overhead mixer, 5 mL of the PLA solution were added via syringe. The mixture was stirred 2 minutes at 1000 rpm following the addition of PLA. PLA precipitated forming white polymeric structures, as illustrated in FIG. 9A (an image of PLA polymeric structures obtained from consolidation in water, and FIG. 9B (a stereo microscope image of the polymeric structures.

Example 5

Crosslinking

Figure 10:
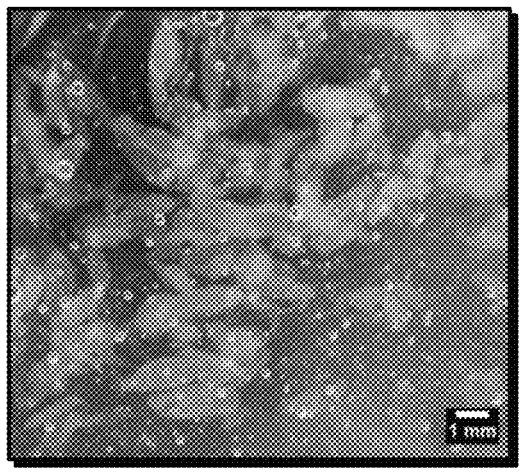
FIG. 10 is an image of CMC polymeric structures obtained from a crosslinking reaction.

A base fluid comprising carboxymethyl cellulose (CMC) (0.5 wt. %) was hydrated in water by mixing in a laboratory blender for 30-60 minutes until fully dispersed. A colloidal solution of nanoalumina particles (30 wt. %) was then added to the polymer solution, at 0.5 vol %, that resulted in a rapid crosslinking reaction that formed polymeric structures. The shear provided (approximately 50-100 $s^{-1}$) by the blender induces formation of elongated polymeric structures as illustrated in FIG. 10 (an image of CMC polymeric structures obtained from the above crosslinking reaction.

Example 6 pH Change

A solution of chitosan (0.48 wt. %) was prepared by hydrating the polymer in 1% acetic acid while stirring the mixture 30 minutes at approximately 2000 rpm in a blender. Next, the chitosan solution was transferred to a beaker. While stirring at 1000 rpm using an overhead mixer, a 30% NaOH solution was added via syringe to reach a final concentration of 1% NaOH. The mixture was stirred 2 minutes at 1000 rpm (submitting the fluid to shear rates between 150 to 300 $s^{-1}$) after addition of NaOH. The chitosan consolidated into white, fiber-like polymeric structures.

Example 7 pH Change

Chitosan was hydrated as described in Example 6. Then hydrolysed guar (0.36 wt. %) was added to the chitosan solution and the mixture was stirred additional 30 minutes in a blender at approximately 2000 rpm to allow hydration of the guar. Then the chitosan-guar solution was transferred to a beaker. The consolidation was accomplished as described in the previous example, at 1000 rpm, in which the fluid was exposed to shear rates between 150 to 300 s$^{-1}$. White, fiber-like precipitates formed.

Example 8

Salinity Change

Figure 11:
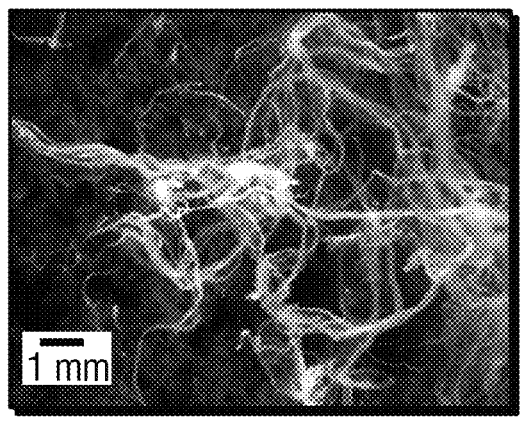
FIG. 11 is a stereo microscope image of polyHEMA polymeric structure, which was formed in deionized water.

A gel solution of poly 2-hydroxyethylmethacrylate (poly-HEMA) was obtained through a free radical polymerization of 2-hydroxyethylmethacrylate in heavy brine. 5.0 grams of 2-hydroxyethylmethacrylate were added to 100 mL of 0.21 wt. % ZnBr$_2$/CaBr$_2$ brine. Additionally, 0.1 gram of 2,2'-Azobis(2-methylpropionamidine) was added as an initiator, and followed by conditioning the sample at 150° F. in a water bath for 24 hours. The polymer gel was then allowed to return to ambient temperature before injecting 20 mL of the polyHEMA solution via syringe, into 150 mL of de-ionized water while applying mixing shear. The shear was applied using an overhead mixer at 600 rpm (corresponding to shear rates between approximately 80 to 180 s$^{-1}$), equipped with a 1.5 inch diameter mixing cylinder. Variable length fiber-like precipitates were generated by the rapid consolidation of the polymer while under shear, as illustrated in FIG. 11 (a stereo microscope image of polyHEMA polymeric structure in deionized water).

Example 9

Temperature Change

Figure 12A:
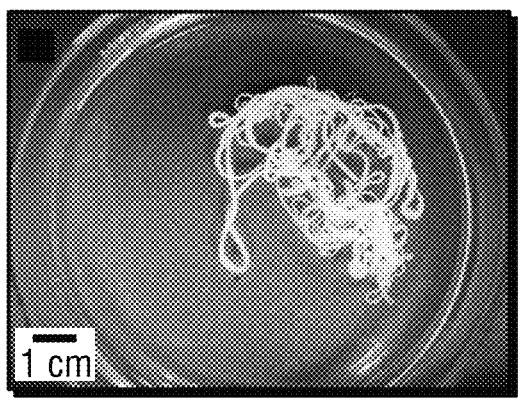
FIG. 12A is an image of HPC elongated polymeric structures obtained by adding HPC solution to hot distilled water.
Figure 12B:
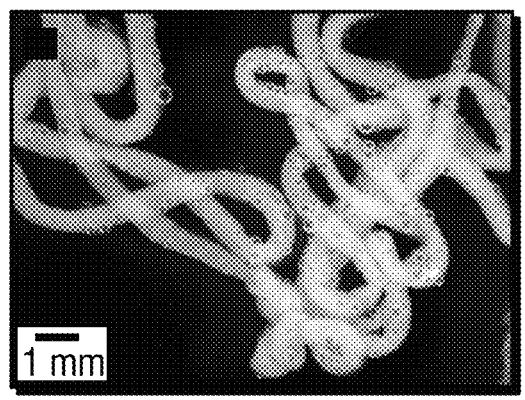
FIG. 12B is a stereo microscope image of these fiber-like polymeric structures.

A solution of hydroxypropyl cellulose (HPC) (1.0 wt. %) was prepared by hydrating the polymer in deionized water while stirring the mixture 60 minutes at approximately 1500 rpm in a blender. Separately, 50 mL of deionized water were added to a 250 mL beaker. The water was heated to 70° C. using a water bath. While stirring the water at 1000 rpm using an overhead mixer with concentric cylinders setup (submitting the fluid to shear rates between 150 and 300 s$^{-1}$), 5 mL of the HPC solution were added via syringe. Mixing was stopped immediately after the addition of HPC. Long, white, fiber-like precipitates formed, as illustrated in FIG. 12A (an image of HPC fiber-like precipitates obtained by adding HPC solution to hot distilled water), and FIG. 12B (a stereo microscope image of the fiber-like precipitates. Air bubbles are entrapped in the fiber-like precipitates). The fiber-like precipitates can be manipulated and are stable while kept in water above about 50° C., but swell and eventually dissolve completely after allowing the mixture to return to room temperature.

Example 10

Crosslinking

Figure 13:
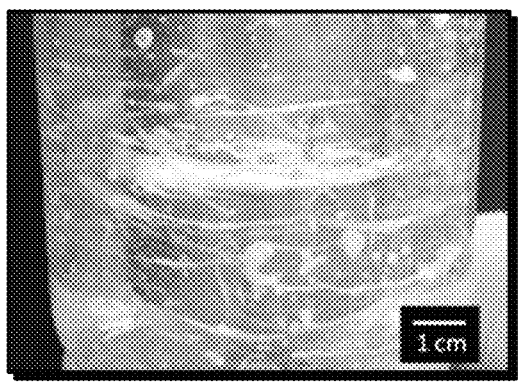
FIG. 13 and FIG. 14 are images of polymeric structures formed by the complex of CMC and ADBAC.
Figure 14:
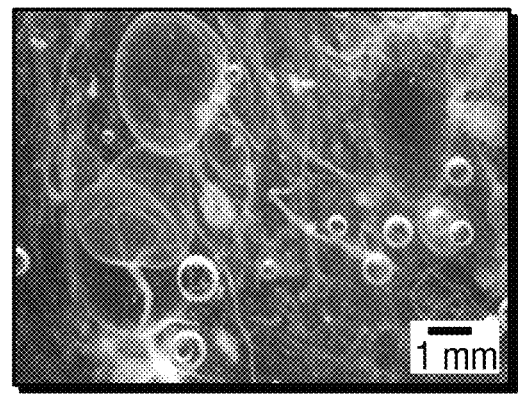
Figure 15:
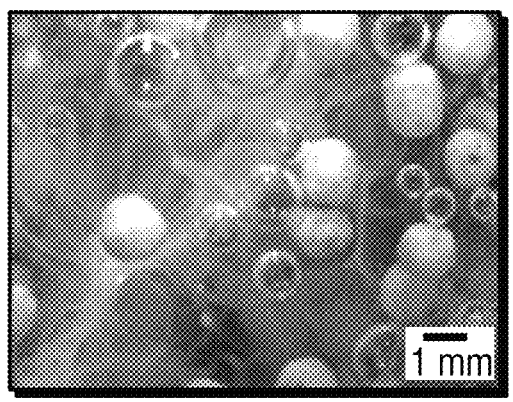
FIG. 15 is an image of a polymeric structures formed by the complex of CMC and ADBAC along with proppant.

A solution of carboxymethyl cellulose (CMC) was prepared by adding 2.5 g CMC powder to a blender containing 500 mL of water and blending for approximately 30 minutes at 1500 rpm to hydrate the gel. In separate container, a solution of 0.5 wt. % alkyl (C12-16) dimethyl benzyl ammonium chloride (ADBAC) was prepared in water. The solution of CMC was stirred with a cylindrical rotor, inducing shear (in a Couette flow). This was followed by the addition of the ADBAC solution, resulting in the immediate formation of white polymeric structures (FIGS. 13-14). As shown in FIG. 15, proppant may be added and contained within the formed polymeric structure. These structures keep flowing with the carrier fluid and remain in suspension in the flow. As the shear is stopped, the solid particles remain dispersed and stable in the carrier fluid for several minutes/hours.

Example 11

Crosslinking

Figure 16:
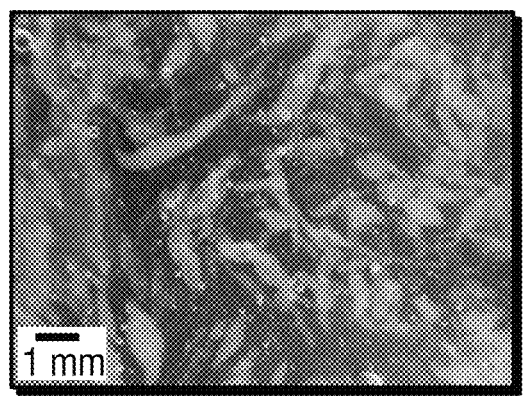
FIG. 16 is an image of a polymeric structure formed from the addition of a colloidal suspension of nanosized particles of colloidal alumina to a solution of CMC.

A base fluid comprising of 0.5 wt % carboxymethyl cellulose (CMC) was hydrated in water by mixing 1.0 g CMC power in 200 mL deionized water using a laboratory blender for 30 minutes. A colloidal solution of nanoalumina particles was then added to the polymer solution, while mixing at 500 rpm. This resulted in the rapid formation of structures shown in FIG. 16. The shear provided by the blender at a high rate induces formation of the elongated polymeric structures.

Example 12

Crosslinking

Figure 17:
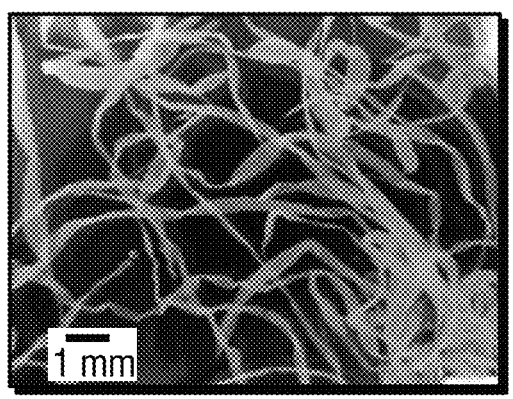
FIG. 17 is a stereo microscope image of a polymeric structure formed from chitosan and SDS.

Ionic interactions between polyelectrolytes and surfactants, containing oppositely charged reactive sites, have been shown to generate filamentous structures. A 0.5 wt. % solution of hydrated chitosan polymer was made by mixing 2.5 g of chitosan powder (high mw, manufactured by Sigma-Aldrich), 500 mL of deionized water and 2.5 mL of glacial acetic acid in a Waring blender at 1500 rpm for 30 minutes. The pH of the mix water was adjusted (pH 3.8) prior to adding the polymer to effectively hydrate the gel. In a separate beaker a 1.0 wt. % solution of sodium dodecyl sulfate (SDS) was dissolved in deionized water. While continuously mixing the SDS solution using an overhead mixer with a 1.5 inch diameter cylinder attached, the hydrated chitosan solution was added using a syringe to inject a steady stream of gel. Individualized polymeric structures were formed that tended to readily entangle or cluster with each other (FIG. 17).

Example 13

Crosslinking

Figure 18:
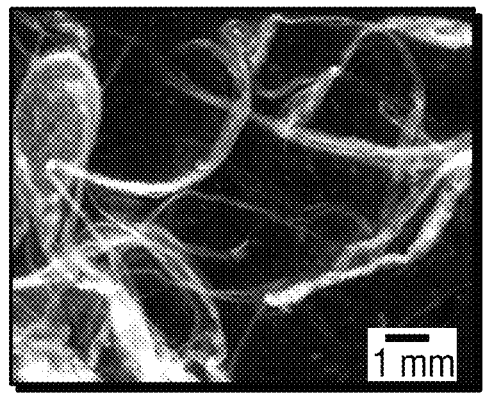
FIG. 18 is a stereo microscope image of a polymeric structure formed from crosslinking CMC with aluminum chloride.

As discussed above, solutions of polyelectrolytes can be crosslinked with multivalent ions from salt solutions such as, but not limited to, aluminum, zirconium, titanium, or iron to form elongated polymeric structures. The elongated polymeric structure illustrated in FIG. 18 was produced by using 150 mL of a pre-hydrated solution of 0.5 wt. % carboxymethyl cellulose (CMC) in deionized water that was placed in beaker and stirred with an overhead mixer using a 2 inch three blade propeller at 600 rpm. Elongated structures were rapidly formed by injecting 1.5 mL (20 wt. % solution of AlCl$_3$.6H$_2$O in deionized water) to polymer solution while continuously mixing. Fiber morphology was highly variable resulting in random lengths and diameters.

Example 14

Crosslinking

Figure 19:
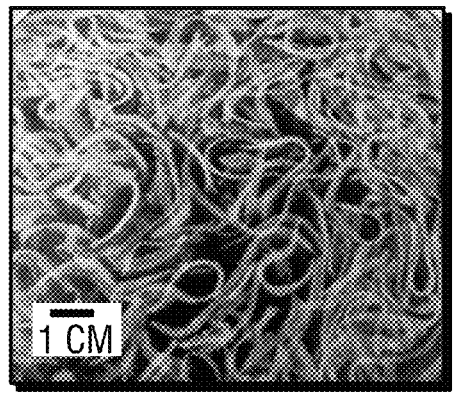
FIG. 19 is a stereo microscope image of a polymeric structure formed from crosslinking carrageenan with calcium.
Figure 20A:
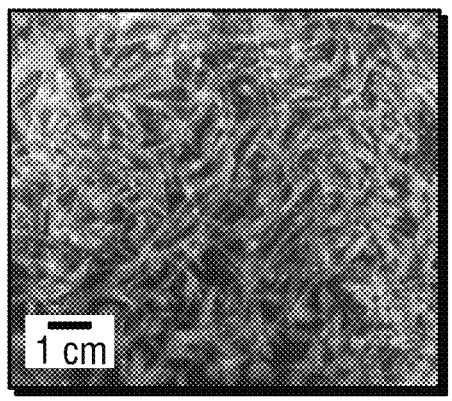
FIG. 20A is an image of polymeric structures formed from sodium alginate crosslinked with calcium.
Figure 20B:
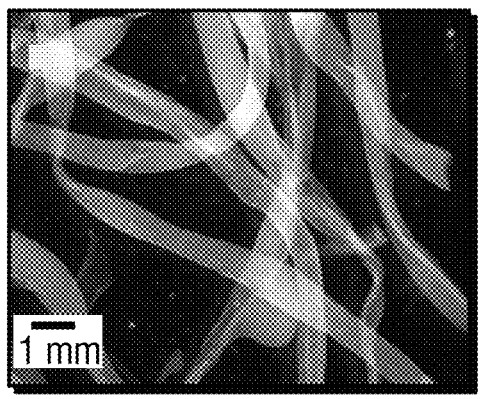
FIG. 20B is a stereo microscope image of these polymeric structures.

Certain polyelectrolyte biopolymers can be readily crosslinked with di-valent cations to form fibers. 20 mL of a pre-hydrated solution of 1.0 wt. % carrageenan Iota in deionized water was injected, using a syringe, into a 150 mL solution of 5.0 wt. % CaCl$_2$.6H$_2$O in deionized while continuously stirring with an overhead mixer at 500 rpm with a 2 inch-3 blade propeller. This produced relatively uniform individualized gel filaments (FIG. 19). Using this same method, alginate fibers were also formed using a pre-hydrated 1.5 wt. % solution of sodium alginate (Sigma Aldrich, alginic acid sodium salt from brown algae) in deionized water injected into 150 mL solution of 5.0 wt. % $CaCl_2 \cdot 6H_2O$, Similarly, these fibers tended to have a relatively uniform diameter (See FIGS. 20A and 20B).

Example 15

Crosslinking

Figure 21:
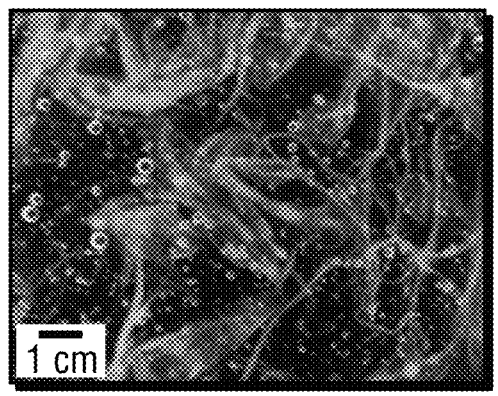
FIG. 21 is an image of polymeric structures formed from the polyelectrolyte complex (PEC) of chitosan and xanthan.

This example demonstrates that fiber like material can be produced through formation of a polyelectrolyte complex (PEC). A hydrated solution of 0.5 wt. % chitosan (Aldrich, high mw) was made by mixing 2.5 g chitosan powder, 500 mL deionized water containing 0.5 vol % glacial acetic acid, resulting in a pH in the range (3.8-4.2), for 30 minutes in a Waring blender at 1500 rpm. Separately a solution 0.5 wt. % xanthan in deionized water was hydrated at neutral pH (6.8-7.2) under the same mixing conditions. After hydration, the two gel solutions were combined in a blender (1:1 volume ratio) for 30 seconds resulting is formation of a gel complex. After several minutes additional shear was applied to shear apart the complex and form suspended "pulp-like" fibrous material (FIG. 21).

Example 16

Crosslinking

Figure 22:
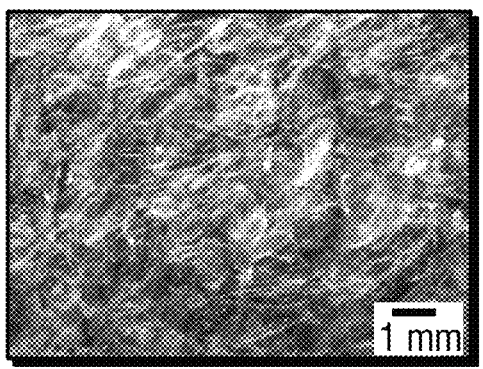
FIG. 22 is a stereo microscope image of polymeric structures formed from the polyelectrolyte complex (PEC) of chitosan and CMC.

A hydrated solution of 0.5 wt. % chitosan (Aldrich, high mw) was made by mixing 2.5 g of chitosan powder in 500 mL deionized water containing 0.5 vol % glacial acetic acid, resulting in a pH in the range (3.8-4.2), for 30 minutes in a Waring blender at 1500 rpm. Separately a solution of 0.5 wt. % carboxymethyl cellulose (CMC) in deionized water was hydrated at neutral pH (6.8-7.2) under the same mixing conditions. After hydration, the two gel solutions were combined in a blender (1:1 volume ratio) for 5 seconds resulting is formation of a fibrous gel complex, as shown in FIG. 22.

Example 17

Salinity Change

A solution of 4.0 wt. % polyvinyl alcohol (PVA) in deionized water was made by adding approximately 8.0 g of dry PVA to 200 mL of deionized water pre-heated to 60° C. while mixing with an overhead mixer for 1 hour. This solution was then directly injected via a 20 mL syringe into a beaker containing a salt solution of 0.5 M $Na_2SO_4$ while stirring with an overhead mixer at 600 rpm. Polymeric structures were formed within several seconds.

Example 18

Crosslinking

Figure 23:
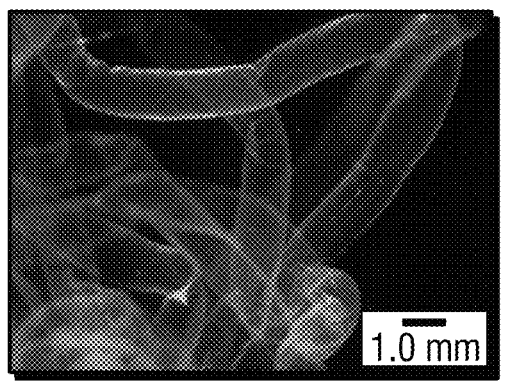
FIG. 23 is a stereo microscope image of polymeric structures formed through the co-annular flow comprised of ADBAC and CMC.

A 1.0 wt. % solution of alkyl dimethyl benzyl ammonium chloride (ADBAC) was made by diluting a concentrated solution of ADBAC in water and stirring. This solution was then circulated through a co-annular flow cell with a 1 cm inner diameter (ID) square outer flow channel at 700 mL/min. Separately a solution of 0.72 wt. % carboxymethyl cellulose (CMC) was hydrated in deionized water by adding 0.72 g of CMC to 100 mL deionized water and mixing in a blender for 30 min. A dye solution was then added for visualizations purposes. The dyed CMC solution was injected into the inner flow pipe at 5 mL/min flow rate. The two streams reacted to form elongated polymeric structures, as shown below in FIG. 23, as the two streams came in contact at the exit of the inner nozzle.

Example 19

Crosslinking

Figure 24:
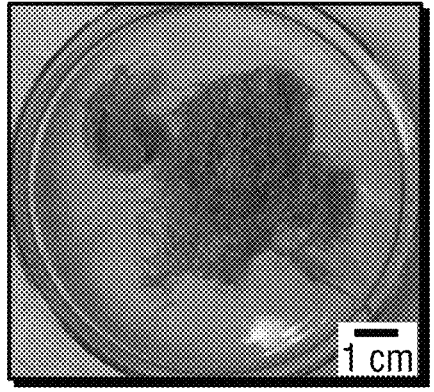
FIG. 24 is an image of polymeric structures formed through the co-annular flow comprised of ADBAC and CMC and KCl.
Figure 25:
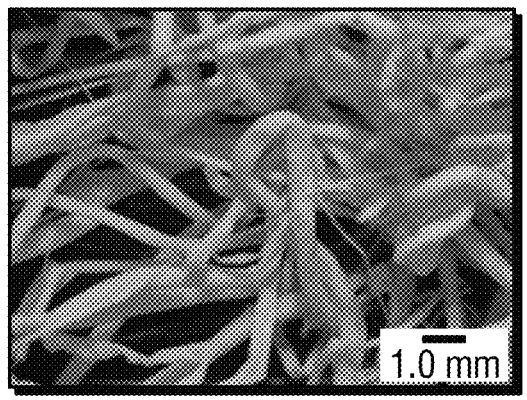
FIG. 25 is a stereo microscope image of these polymeric structures.

The formation of the elongated polymeric structure described in example 18 can be inhibited by adding high amount of KCl salt>4.0 wt. %. In the present example both reactive components are placed in the same solution stream by intentionally inhibiting their interactions through the addition monovalent salt (KCl). A solution of 0.72 wt. % carboxymethyl cellulose (CMC) was hydrated in a solution of 5.0 wt. % KCl in water by adding 0.72 g of CMC to 100 mL water and 5.0 wt. % potassium chloride (KCl) salt and mixing in a blender for 30 min. 4.6 mL of a 50% solution of alkyl dimethyl benzyl ammonium chloride (ADBAC) was then added to the mixing solution. Deionized water was then circulated through a co-annular flow cell comprised of a 1 cm ID square outer flow channel and a 1.0 mm ID inner pipe. The CMC/ADBAC/salt solution was injected into the inner flow pipe at 5 mL/min flow rate. Elongated polymeric structures, as shown in FIGS. 24 and 25, formed through the contact with fresh water, allowing the diffusion of salt inhibitor from the polymer solution. The loss of salt then allowed for polymer complexation and subsequent structure formation.

Example 20

Figure 26:
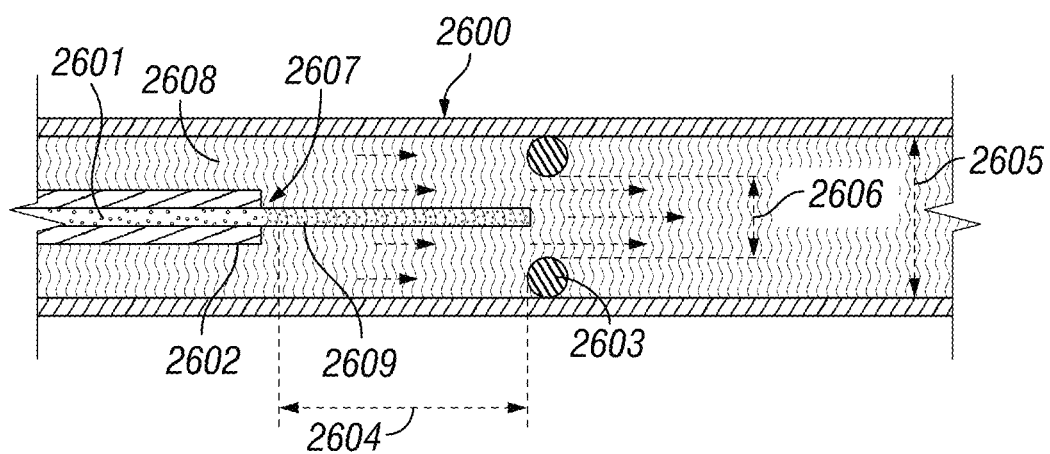
FIG. 26 is a schematic illustration of tailoring the length of the polymeric structure.
Figure 27A:
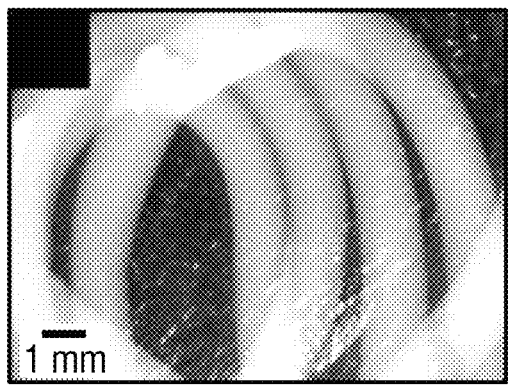
FIGS. 27 A-D are stereo microscope images of various chitosan fibers to illustrate the effect that shear rate has on the diameter of the polymeric structure.
Figure 27B:
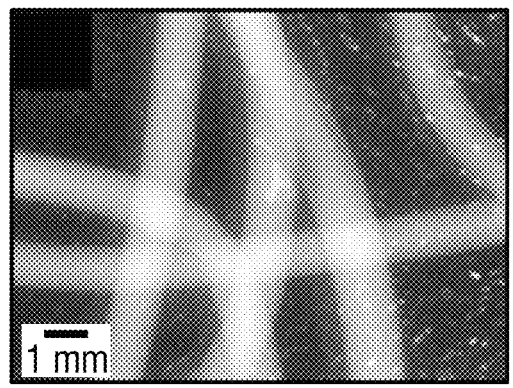
Figure 27C:
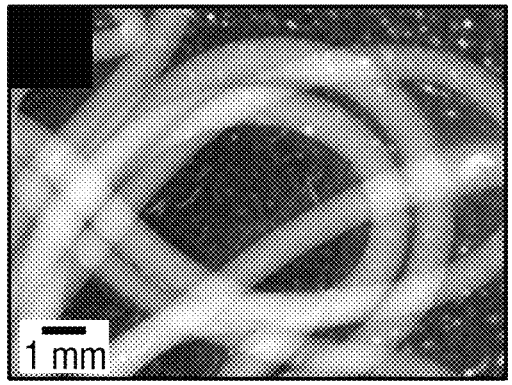
Figure 27D:
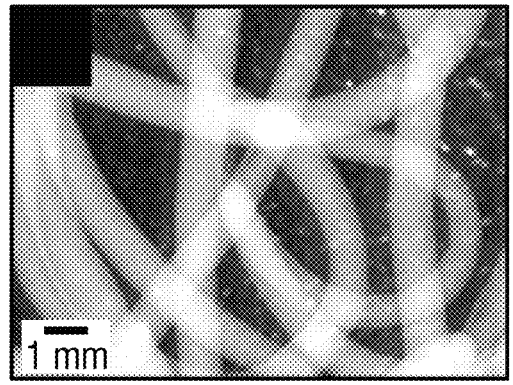

A custom-built co-annular flow cell 2600, as shown in FIG. 26, was constructed of optically clear acrylic containing a 0.95 cm (⅜ inch) inner diameter (ID) tube outer flow channel 2605 with a 1/16" OD, 1.0 mm ID stainless steel tube centered within the channel. The end (exit) of the inner tubing was positioned 8.5 cm within a 30 cm long flow cell. O-rings 2603, reducing the effective diameter to a predetermined diameter 2606 (e.g., 0.44 cm), were placed a predetermined distance 2604 (e.g., 5 cm) downstream of the injection point 2607 of the inner tube 2602.

A 2.0% sodium alginate solution 2601 was injected through the injection point 2607 into the outer pipe using a high pressure ISCO syringe pump at 5.0 mL/min. A solution of 5.0 wt. % $CaCl_2 \cdot 2H_2O$ 2608 was simultaneously pumped in the outer pipe via an impeller pump with variable controller (not shown). This process results in the polymer crosslinking shortly after contacting with the calcium in the outer flow. Once the leading front of the polymeric structure reaches the o-rings 2603, the increased velocity accelerates the polymeric structure causing it to break at the weakest point, at the inner nozzle tip. During a continuous injection, this process is repeated at regular intervals resulting in the elongated polymeric structures 2609 of a given length (e.g., 5 cm±0.5 cm).

Example 21

A custom-built cylindrical bob (4 cm diameter) made from polyethylene was adapted to an overhead mixer to have a concentric cylinder setup when used in conjunction with a 200 mL beaker. The beaker was filled with 50 mL of coagulation bath and centered in the cylindrical bob. The speed of the bob was controlled by the digital mixer controller. The gap between the bob and the beaker wall was 1.2 cm, so the fluid experienced a range of shear rates. The shear rate at the center of the gap was calculated using the equation below.

$$\dot{\gamma} = \frac{2\omega R_c^2 R_b^2}{x^2(R_c^2 - R_b^2)}$$

ω=angular velocity of bob $$(\text{rad/s}) = \left(\frac{2\pi}{60}\right) N,$$

N=rpm
$R_c$=radius of container (cm)
$R_b$=radius of the spinning bob (cm)
x=radius at which shear rate is being calculated (cm)

The polymer solution (10 mL) was injected via syringe using a syringe pump (40 mL/min), while mixing the coagulation bath. A tube (2 mm outer diameter) was connected to the syringe tip and pointed to the center of the gap between the bob and the beaker. Mixing was stopped a few seconds after the polymer addition was complete because the formation of fibers was immediate.

A solution of 1.5 wt. % sodium alginate was prepared by hydrating the polymer in deionized water while stirring the mixture 30 minutes at approximately various speeds (see Table 1 below) in a blender. 10 mL of the alginate solution was injected into 5 wt. % $CaCl_2.2H_2O$ using the Couette setup described above. At low shear rates, (~20 $s^{-1}$) elongated wavy polymeric structures were formed. In contrast, regular diameter fiber polymeric structures were obtained at shear rate≥60 $s^{-1}$. As shown below in Table 1, the fiber diameter decreased as the shear rate was increased.

Example 22

A solution of 2 wt. % chitosan was prepared by hydrating the polymer in deionized water while stirring the mixture 30 minutes at various speeds (See Table 1 below) in a blender. 10 mL of the chitosan solution was injected into 1% NaOH using the Couette setup described above. Chitosan consolidated into long, white fibers. The fiber diameter decreased at increasing shear rates, as shown in Table 1. The diameter of fibers made at 400 $s^{-1}$ was about 2× smaller than those made at 60 $s^{-1}$. In all cases, however, the fibers had a smaller diameter than the nozzle used (2 mm) (See FIGS. 27A-27D). This trend and actual fiber diameters were very similar to those obtained with Ca-alginate fibers.

TABLE 1

Effect of shear in Couette setup on fiber diameter.

| rpm | γ̇ center of gap ($s^{-1}$) | Alginate fibers diameter (mm) (Example 21) | Chitosan fibers diameter (mm) (Example 22) |
| --- | --- | --- | --- |
| 300 | 58.67 | 1.36 ± 0.15 | 1.32 ± 0.09 |
| 500 | 97.79 | 0.88 ± 0.12 | 1.05 ± 0.10 |
| 800 | 156.47 | 0.80 ± 0.08 | 0.80 ± 0.05 |

TABLE 1-continued

Effect of shear in Couette setup on fiber diameter.

| rpm | γ̇ center of gap ($s^{-1}$) | Alginate fibers diameter (mm) (Example 21) | Chitosan fibers diameter (mm) (Example 22) |
| --- | --- | --- | --- |
| 1000 | 195.59 | 0.75 ± 0.06 | 0.79 ± 0.04 |
| 1500 | 293.38 | 0.64 ± 0.11 | 0.84 ± 0.09 |
| 2000 | 391.17 | 0.46 ± 0.10 | 0.68 ± 0.04 |

Example 23

Figure 31:
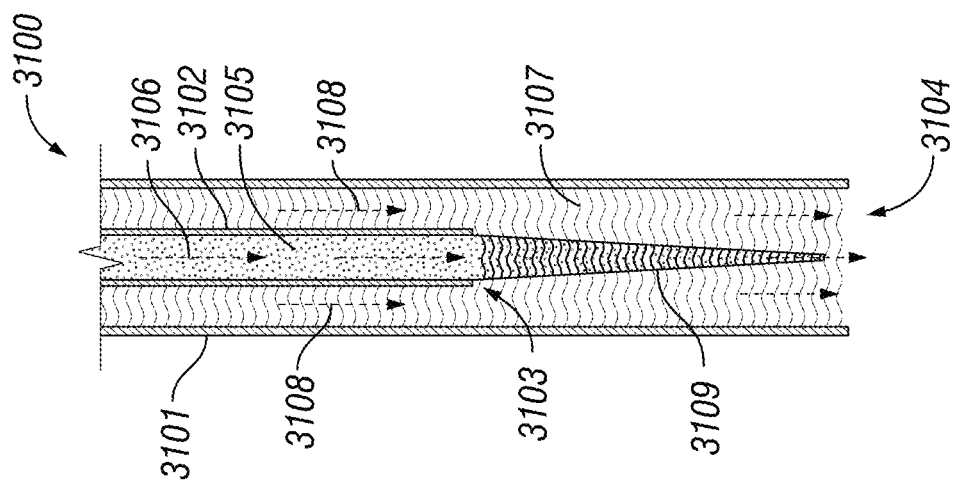
FIG. 31 is a schematic illustrate of a possible method of forming a polymeric structure.

A custom-built co-annular flow cell 3100, as shown in FIG. 31, was constructed of an optically clear acrylic containing a 1 cm square shaped outer flow channel 3101 with a 1/16" OD, 1.0 mm ID stainless steel tube 3102 centered within the channel. The end (exit) of the inner tubing 3103 was positioned 8.5 cm within a 30 cm long flow cell. The discharge 3104 of the flow cell 3100 was open to atmosphere and collected in a separate container (not shown).

A solution of 1 wt % sodium alginate was prepared by hydrating the polymer in deionized water while stirring the mixture 30 minutes at approximately 1500 rpm in a blender. Using a co-annular setup similar to that described above and illustrated in FIG. 31, the alginate solution 3105 was injected at a first flow rate ($Q_i$) 3106 into the outer channel 3017. The outer channel 3107 contained a 5 wt % solution of $CaCl_2.2H_2O$ used as coagulation bath and was injected at a different flow rate ($Q_o$) 3108 than 3106 in the outer channel 3107. The diameter of the resulting calcium-alginate fibers 3109 decreased as the flow rate 3108 of the coagulation bath in the outer channel 3107 was increased, as shown below in Table 2.

TABLE 2

Effect of shear in co-annular setup on fiber diameter

| $Q_0$ (mL/min) | γ̇ at interface ($s^{-1}$) | Fibers diameter using $CaCl_2$ (mm) |
| --- | --- | --- |
| 350 | 16.00 | 0.97 ± 0.16 |
| 600 | 51.43 | 0.48 ± 0.09 |
| 750 | 72.68 | 0.45 ± 0.05 |
| 1050 | 115.19 | 0.39 ± 0.06 |
| 1310 | 152.04 | 0.36 ± 0.03 |
| 1700 | 207.30 | 0.43 ± 0.13 |

Example 24

Using the co-annular setup described above and in FIG. 31, a 1% alginate solution 3105 was injected at a first flow rate ($Q_i$) 3106 into the outer channel 3107. The outer channel 3107 contained a 5 wt % $CaCl_2.2H_2O$ and 0.36 wt % guar as coagulation bath and was injected at a different flow rate ($Q_o$) 3108 than 3106 in the outer channel 3107. Similar to Example 23, the diameter of the resulting calcium-alginate fibers 3109 decreased as the flow rate 3108 of the coagulation bath in the outer channel 3107 was increased, as shown below in Table 3.

TABLE 3

Effect of shear in co-annular setup on fiber diameter.

| $Q_0$ (mL/min) | $\dot{\gamma}$ at interface ($s^{-1}$) | Fibers diameter using $CaCl_2$/guar (mm) |
|---|---|---|
| 300 | 8.91 | 0.40 ± 0.08 |
| 450 | 30.17 | 0.38 ± 0.08 |
| 710 | 67.01 | 0.31 ± 0.03 |
| 900 | 93.94 | 0.26 ± 0.03 |

Although the preceding description has been described herein with reference to particular means, materials and embodiments, it is not intended to be limited to the particulars disclosed herein; rather, it extends to all functionally equivalent structures, methods and uses, such as are within the scope of the appended claims. Furthermore, although only a few example embodiments have been described in detail above, those skilled in the art will readily appreciate that many modifications are possible in the example embodiments without materially departing from the disclosure of METHODS OF TREATMENT OF A SUBTERRANEAN FORMATION WITH POLYMERIC STRUCTURES FORMED IN SITU. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed is:

1. A method for treating a subterranean formation at a wellsite, the method comprising:
    preparing a treatment fluid that contains one or more dissolved polymers capable of forming a plurality of fibrous polymeric structures;
    placing the treatment fluid into a subterranean formation via a wellbore; and
    adjusting at least one parameter of the treatment fluid and applying a shear rate in the wellbore, thereby causing the one or more dissolved polymers in the treatment fluid to precipitate and form fibrous polymeric structures in situ, the fibrous polymeric structures having an aspect ratio of at least 2:1;
    wherein the shear rate applied to the treatment fluid is between about 1 $s^{-1}$ and 100,000 $s^{-1}$.

2. The method of claim 1, wherein the at least one parameter being adjusted is selected from the group consisting of a temperature of the treatment fluid, an ionic concentration of the treatment fluid, a concentration of polyelectrolyte complexes in the treatment fluid, a pH of the treatment fluid, a hydrophobicity of the one or more polymers, a solvent composition of the treatment fluid, a cross-linking of the one or more polymers, and an average molecular weight of the one or more polymers.

3. The method of claim 1, wherein the at least one parameter is adjusted at a surface of the wellbore before the treatment fluid is placed into the wellbore.

4. The method of claim 1, wherein the at least one parameter is adjusted within the wellbore to consolidate the one or more polymers after the treatment fluid has been placed into the wellbore.

5. The method of claim 1, wherein applying the shear rate occurs at a surface of the wellbore before the treatment fluid is placed into the wellbore.

6. The method of claim 1, wherein the exposing the treatment fluid to a shear event to form the plurality of polymeric structures occurs at one or more underground locations selected from the group consisting of the wellbore and the subterranean formation.

7. The method of claim 1, wherein the exposing the treatment fluid to a shear event to form the plurality of polymeric structures occurs within the subterranean formation.

8. The method of claim 1, wherein the one or more polymers is added to the treatment fluid at an underground location within the wellbore.

9. The method of claim 1, wherein the treatment fluid is selected from the group consisting of a fluid loss control pill, a water control treatment fluid, a scale inhibition treatment fluid, a fracturing fluid, a gravel packing fluid, a drilling fluid, and a drill-in fluid.

10. The method of claim 1, wherein the one or more polymers comprise at least one pH-sensitive polymer.

11. The method of claim 10, wherein the treatment fluid is placed into the subterranean formation at a pH effective to inhibit consolidation of the one or more polymers in the subterranean formation.

12. The method of claim 11, wherein a pH adjustment shifts the pH to a pH that is effective to induce consolidation of at least one of the one or more polymers in the subterranean formation.

13. The method of claim 12, further comprising a second pH adjustment after the treatment fluid is placed into the subterranean formation at a pH effective to reverse the consolidation of the one or more polymers in the subterranean formation.

14. The method of claim 12, wherein the first pH adjustment changes the pH of at least a portion of the treatment fluid by at least one pH unit.

15. The method of claim 1, wherein the one or more polymers comprise at least one cross-linkable polymer.

16. The method of claim 15, wherein the one or more dissolved polymers consolidates as a result of a crosslinking reaction, which forms one or more crosslinked polymers.

17. The method of claim 16, wherein the one or more crosslinked polymers are crosslinked with one or more members selected from the group consisting of divalent cations, polyvalent cations, calcium, magnesium, copper, chromium, iron, boron, aluminum, titanium, and zirconium.

18. The method of claim 16, wherein the one or more crosslinked polymers comprise at least one member selected from the group consisting of a polysaccharide and a polyelectrolyte.

19. The method of claim 1, wherein the one or more polymers comprise at least two oppositely charged polyelectrolyte polymers.

20. The method of claim 19, wherein the one or more polymers consolidate to form one or more polyelectrolyte complexes.

21. The method of claim 1, wherein the one or more polymers comprise at least one polyelectrolyte polymer and at least one oppositely charged surfactant.

22. The method of claim 1, wherein the method further comprises contacting the one or more dissolved polymers with an additional treatment fluid to change the salinity or the ionic concentration of the treatment fluid comprising the one or more dissolved polymers to consolidate the one or more dissolved polymers into the fibrous polymeric structures.

23. The method of claim 1, wherein the method further comprises contacting the one or more dissolved polymers with a solvent to consolidate the one or more dissolved polymers and form the fibrous polymeric structures.

24. The method of claim 1, wherein the treatment fluid further comprises a proppant.

25. The method of claim 24, wherein the fibrous polymeric structures provide fiber assisted proppant transport.

26. The method of claim 1, wherein placing the treatment fluid comprises injecting the treatment fluid into a formation adjacent a wellbore in the subterranean formation at a pressure sufficient to create a fracture in the formation, the fracture having opposing faces.

27. The method of claim 24, wherein the treatment fluid injection is followed by injection of a proppant-containing fluid comprising the fibrous polymeric structures of the one or more dissolved polymers.

28. The method of claim 1, further comprising:
  circulating the treatment fluid in the well while drilling;
  forming a filter cake comprising the fibrous polymeric structures on a downhole surface in the subterranean formation;
  contacting the filter cake in a production zone with a solution to restore permeability of the downhole surface in the subterranean formation; and
  producing fluid from a formation in the production zone.

* * * * *